US011131192B2

(12) United States Patent
Goldfarb et al.

(10) Patent No.: US 11,131,192 B2
(45) Date of Patent: Sep. 28, 2021

(54) CYLINDER ACTUATOR

(71) Applicant: Vanderbilt University, Nashville, TN (US)

(72) Inventors: Michael Goldfarb, Nashville, TN (US); Harrison Bartlett, Nashville, TN (US); Beau Johnson, Nashville, TN (US)

(73) Assignee: Vanderbilt University, Nashville, TN (US)

( * ) Notice: Subject to any disclaimer, the term of this patent is extended or adjusted under 35 U.S.C. 154(b) by 0 days.

(21) Appl. No.: 16/963,939

(22) PCT Filed: Feb. 1, 2019

(86) PCT No.: PCT/US2019/016369
§ 371 (c)(1),
(2) Date: Jul. 22, 2020

(87) PCT Pub. No.: WO2019/152852
PCT Pub. Date: Aug. 8, 2019

(65) Prior Publication Data
US 2021/0040852 A1    Feb. 11, 2021

Related U.S. Application Data

(60) Provisional application No. 62/625,074, filed on Feb. 1, 2018, provisional application No. 62/739,451, filed on Oct. 1, 2018.

(51) Int. Cl.
*F01B 7/16* (2006.01)
(52) U.S. Cl.
CPC ......... *F01B 7/16* (2013.01); *F15B 2211/7055* (2013.01)
(58) Field of Classification Search
CPC ..................... F15B 2211/7055; F01B 7/16
See application file for complete search history.

(56) References Cited

U.S. PATENT DOCUMENTS

| 4,296,677 A | 10/1981 | Little |
| 4,528,894 A | 7/1985 | Crosby |

(Continued)

FOREIGN PATENT DOCUMENTS

| CN | 1526960 A | 9/2004 |
| EP | 1580437 A1 | 9/2005 |
| WO | WO 2011/042301 A1 | 4/2011 |

OTHER PUBLICATIONS

Pastrakuljic. V., "Design and Modeling of a New Electro Hydraulic Actuator," Department of Mechanical Engineering, University of Toronto, 1995.

(Continued)

*Primary Examiner* — F Daniel Lopez
(74) *Attorney, Agent, or Firm* — Nixon Peabody LLP

(57) ABSTRACT

A cylinder actuator includes a body assembly and a piston assembly. The body assembly includes a first cylinder nested concentrically within a second cylinder. The piston assembly slides linearly within the first and second cylinders. The piston assembly includes a first piston assembly end and a second piston assembly end. The first piston assembly end includes first and second pistons. The first piston moves within the first cylinder. The second piston moves within the second cylinder. The piston assembly includes first and second piston rods. The first piston rod extends from the first piston through a first end of the first cylinder. The second piston rod extends from the second piston through a first end of the second cylinder. The piston rods are joined at the second end of the piston rod assembly located outside of the first and second cylinders.

21 Claims, 14 Drawing Sheets

(56) References Cited

U.S. PATENT DOCUMENTS

| | | | | |
|---|---|---|---|---|
| 4,531,451 | A | * | 7/1985 | Mouton ............... F15B 11/036 91/519 |
| 4,907,495 | A | | 3/1990 | Sugahara |
| 5,960,693 | A | * | 10/1999 | Yuda, Jr. ............... F15B 15/088 60/407 |
| 8,944,157 | B2 | * | 2/2015 | Mail ....................... B66B 9/04 166/77.4 |
| 9,441,644 | B2 | | 9/2016 | Lind |
| 2015/0354604 | A1 | | 12/2015 | Froehlich |

OTHER PUBLICATIONS

Habibi, S. et al., "High Precision Hydrostatic Actuation Systems for Micro- and Nanomanipulation of Heavy Loads," Journal of Dynamic Systems, Measurement, and Control 128, Dec. 2006, pp. 778-787.

Linjama, M. et al., "Secondary Controlled Multi-Chamber Hydraulic Cylinder," The $11^{th}$ Scandinavian International Conference on Fluid Power, Jun. 2009.

Quan. Z. et al., "Review of energy efficient direct pump controlled cylinder electro-hydraulic technology," Renewable and Sustainable Energy Reviews 35, Apr. 2014, pp. 336-346.

Moog, Inc., "Electro Hydrostatic Actuators: A New Approach in Motion Control," $2^{nd}$ Workshop on Innovative Engineering for Fluid Power, Sep. 2014.

Heybroek, K. & Norlin, E., "Hydraulic Multi-Chamber Cylinders in Construction Machinery," Hydraulikdagarna, Mar. 2015.

Linjama, M. et al., "Hydraulic Hybrid Actuator: Theoretical Aspects and Solution Alternatives," The $14^{th}$ Scandinavian International Conference on Fluid Power, May 2015.

Xiao-Ming, W. et al., "The Four-chamber Hydraulic Cylinder," 2016 IEEE/CSAA International Conference on Aircraft Utility Systems (AUS), Oct. 2016, pp. 686-689.

International Preliminary Report on Patentability in International Application No. PCT/US2019/016369, dated Aug. 4, 2020 (9 pages).

International Search Report and Written Opinion in International Application No. PCT/US2019/016369, dated Jul. 24, 2019 (14 pages).

\* cited by examiner

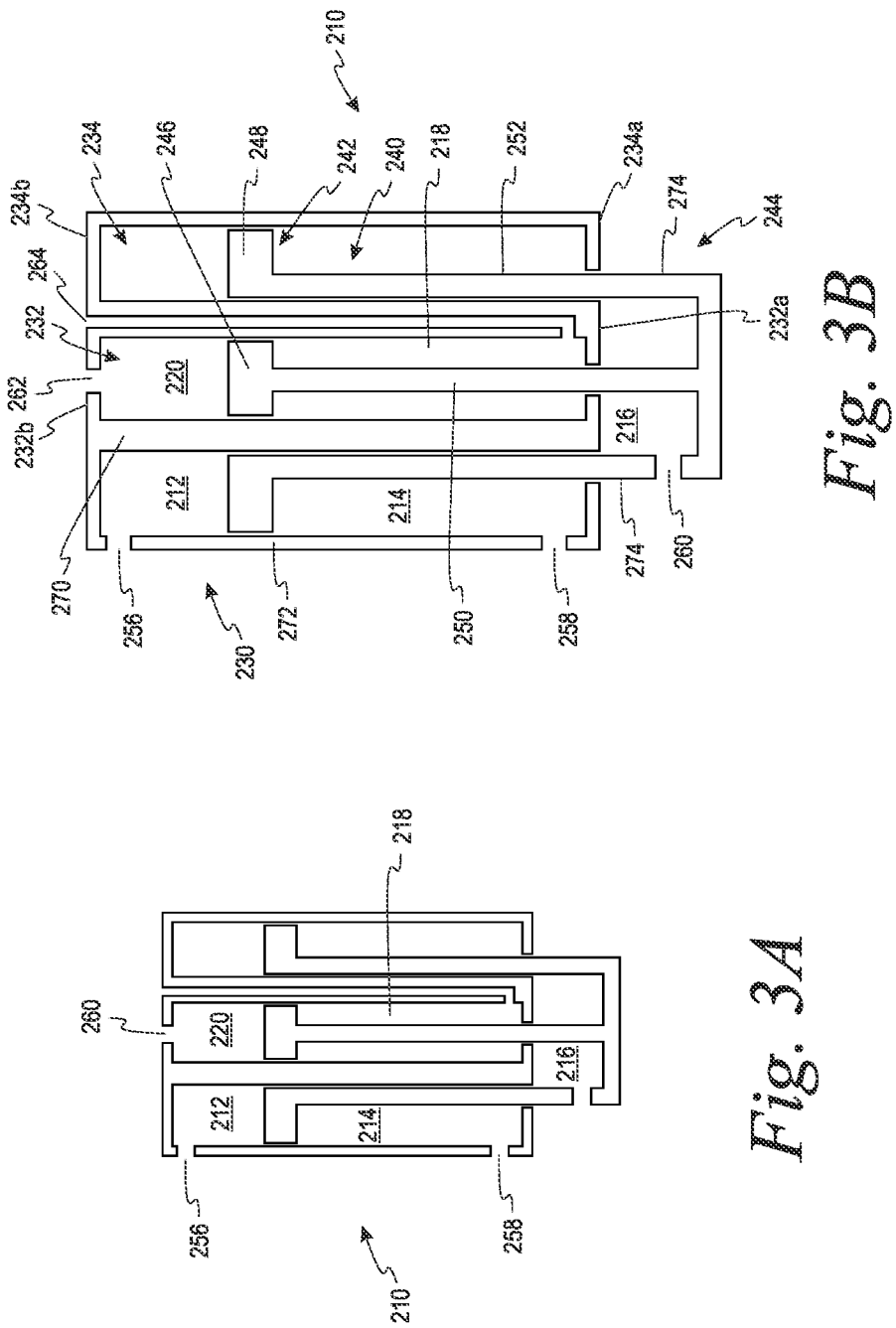

CYLINDER ACTUATOR

CROSS-REFERENCE TO RELATED APPLICATIONS

This application is a U.S. National Stage Entry of International Application No. PCT/US2019/016369, filed Feb. 1, 2019, which claims priority to and the benefit of U.S. Provisional Application No. 62/625,074, filed Feb. 1, 2018, and of U.S. Provisional Patent Application No. 62/739,451, filed Oct. 1, 2018, the content of all of which are herein incorporated by referenced in their entireties.

STATEMENT OF GOVERNMENT SUPPORT

This invention was made with government support under contract no. W81XWH-15-2-0068 awarded by the Department of Defense. The government has certain rights in the invention.

FIELD OF THE INVENTION

The present invention relates to hydraulic or pneumatic cylinder actuators, and more specifically to apparatus for a cylinder actuator that desirably maintains a constant fluid volume as a function of the piston stroke.

BACKGROUND OF THE INVENTION

Hydraulic systems commonly utilize single-rod cylinders for actuation. The presence of a single rod in existing single-rod cylinder actuators results in fluid force and volume asymmetry within the system. Piston areas are asymmetric because the fluid volume within the cylinder changes as a function of stroke length. This asymmetry presents a particular challenge for closed hydraulic cylinder actuation systems (i.e., systems in which the fluid volume is not open to a reservoir). Closed systems can accommodate the volume asymmetry by incorporating an accumulator, although doing so requires additional fluid control componentry and typically imposes significant performance constraints. Alternatively, a double-rod cylinder actuator may be utilized to eliminate volume asymmetry in the actuator. This, however, require cylinders to have a greater design size envelope and generally entail more complex mounting than single-rod cylinder actuators.

Therefore, there is a need for a cylinder actuator that is configured to provide volume symmetry (i.e., constant-volume behavior) and provides the functional capabilities of a double-rod cylinder actuator in a substantially smaller packaging.

SUMMARY OF THE INVENTION

According to one embodiment, a cylinder actuator comprises a body assembly and a piston assembly. The body assembly includes a first cylinder nested concentrically within a second cylinder. The first cylinder includes a first end and a second end. The second cylinder includes a first end and a second end. The piston assembly slides linearly within the first and second cylinders of the body assembly. The piston assembly includes a first piston assembly end and a second piston assembly end. The first piston assembly end includes a first piston and a second piston. The first piston is configured to move within the first cylinder. The second piston is configured to move within the second cylinder. The piston assembly further includes a first piston rod and a second piston rod. The first piston rod extends from the first piston through the first end of the first cylinder. The second piston rod extends from the second piston through the first end of the second cylinder. The first and second piston rods are joined at the second end of the piston rod assembly that is located outside of the first and second cylinders.

According to another embodiment, a cylinder actuator comprises a body assembly and a piston assembly. The body assembly includes a first cylinder nested concentrically within a second cylinder, thereby creating a circular cross-section within the first cylinder and an annular cross-section between the first and second cylinders. The first cylinder includes a first cylinder end and a second cylinder end. The second cylinder includes a first cylinder end and a second cylinder end. The piston assembly slides linearly within the first and second cylinders of the body assembly. The piston assembly includes a first piston assembly end and a second piston assembly end. The first piston assembly end includes a first piston and a second piston. The first piston is configured to move within the first cylinder. The second piston forms an annular shape and is configured to move within the second cylinder in the annular space between the first and second cylinders. The piston assembly further includes a first piston rod and a second piston rod. The first piston rod extends from the first piston through the first end of the first cylinder. The second piston rod extends from the second piston through the first end of the second cylinder. The first and second piston rods are joined at the second end of the piston rod assembly that is located outside of the first and second cylinders.

BRIEF DESCRIPTION OF THE DRAWINGS

FIG. 3A is a schematic drawing of a five-chamber cylinder actuator with chambers and ports identified according to one embodiment of the present application.

FIG. 3B is an enlarged schematic drawing of the five-chamber cylinder actuator of FIG. 3A with additional reference numbers.

DETAILED DESCRIPTION

Figure 1A:
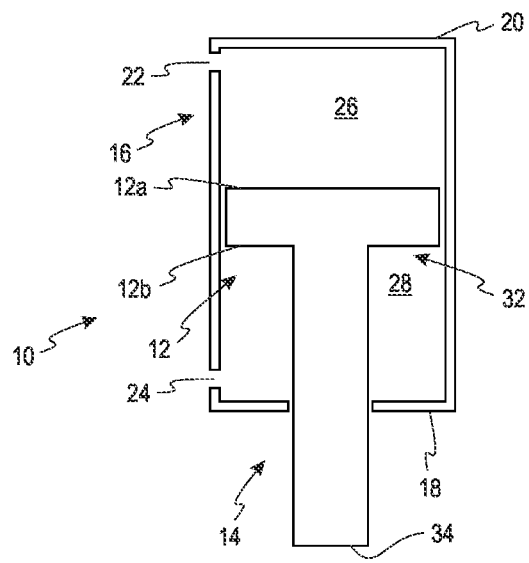
FIG. 1A is a prior art schematic drawing of a single-rod cylinder actuator.

The present invention is described with reference to the attached figures, wherein like reference numerals are used throughout the figures to designate similar or equivalent elements. The figures are not drawn to scale and they are provided merely to illustrate the instant invention. Several aspects of the invention are described below with reference to example applications for illustration. It should be understood that numerous specific details, relationships, and methods are set forth to provide a full understanding of the invention. One having ordinary skill in the relevant art, however, will readily recognize that the invention can be practiced without one or more of the specific details or with other methods. In other instances, well-known structures or operations are not shown in detail to avoid obscuring the invention.

A prior art single-rod cylinder actuator 10 is shown in FIG. 1A. The single-rod cylinder actuator 10 includes a piston 12 and a rod assembly 14, which slides axially within a cylinder 16. The cylinder 16 includes a first end 18 and a second end 20. The first and second ends 18, 20 of the cylinder 16 includes a first fluid port 22 and a second fluid port 24, respectively, which allow fluid to enter or exit the respective ends 18, 20 of the cylinder 16.

The piston 12 separates the cylinder 16 into two fluid volumes—a first fluid volume 26 and a second fluid volume 28. Each of these fluid volumes 26, 28 is filled with a respective first and second volume of working fluid. The first volume of working fluid imposes a net extension force on the piston 12, and the second volume of working fluid imposes a net retraction force on the piston 12. The first fluid port 22 in the cylinder 16 provides fluid connectivity between the first fluid volume 26 and external fluid apparatus, while the second fluid port 24 provides fluid connectivity between the second fluid volume 28 and external fluid apparatus. The fluid contained within each of the first and second fluid volumes 26, 28 generally are characterized by different pressures, such that the piston 12 will be subject to a net force given by the difference of the respective fluid volume pressures, weighted by the exposed area of contact between each fluid volume and its respective contact area on the piston 12.

The rod assembly 14 of FIG. 1A includes a single rod with a first rod end 32 and a second rod end 34. The first rod end 32 connects to the piston 12 inside the cylinder 16. The rod assembly 14 extends through an end of the cylinder 16 through a sealing element (not shown), and continues outside the cylinder. The second rod end typically includes a connection means for connecting to an external mechanism. The actuator is thus interfaced with an external mechanical apparatus by connecting a first end of the cylinder 16 to a first interface point and the second rod end to a second interface point, such that the relative motion between the cylinder and piston, and the relative force resulting from the differential fluid pressure, are transmitted to the first interface point, relative to the second interface point.

The presence of a single rod in the cylinder actuator 10 of FIG. 1A introduces two related operational characteristics into the behavior of the actuator. The first is force asymmetry, and the second is volume asymmetry. Regarding the first operational characteristic, due to the presence of the rod, the area of the piston 12 exposed to fluid on a second side 12b of the piston 12 (i.e., the rod side of the piston) is different from the area exposed on the first side 12a of the piston 12 (i.e., the non-rod side of the piston). Specifically, the area of the first side 12a of the piston 12 is nominally the sectional area of the cylinder, while the area of the second side 12b of the piston 12 is nominally the sectional area of the cylinder, less the sectional area of the rod. Since these respective piston areas are unequal, the relationship between the fluid pressure in the first and second fluid volumes 26, 28 of the cylinder 16 and the actuator force is asymmetric. Specifically, a positive differential pressure of a given magnitude from the first side to the second side of the piston will result in an actuator force of one sign and magnitude, while a positive pressure differential of the same pressure magnitude from the second side to the first side of the piston will result in an actuator force of different sign and different magnitude. As such, the rod introduces a magnitude asymmetry between differential pressure and rod force.

The second operational characteristic is volume asymmetry, which is a result of the volume occupied by the rod as it is moved into and out of the second fluid volume 28 of the cylinder 16. When the piston 12 and the rod assembly 14 are configured in the fully extended position (i.e., the rod is fully extended from the cylinder), the total volume of fluid in the cylinder is nominally the product of the sectional area of the cylinder and the length of the cylinder interior. When the piston 12 and rod assembly 14 are configured in the fully retracted position (i.e., the rod is fully retracted into the cylinder), the total volume of fluid in the cylinder is nominally the product of the sectional area of the cylinder and the length of the cylinder interior, less the volume of the rod (i.e., less the product of the sectional area of the rod and the length of the cylinder). As such, to move the piston along the length of the cylinder, allowance must be made to either add or remove net fluid volume from the cylinder.

Hydraulic systems can generally be classified as "open" or "closed" systems. Open systems are more common. Open systems incorporate a fluid reservoir, which is able to accommodate a variable fluid volume in the system and, thus, are able to accommodate using single-rod cylinder actuators.

A closed hydraulic system does not include a fluid reservoir. In closed systems, a variable fluid volume can be accommodated using an accumulator in the closed fluid circuit. The accumulator may be open to atmospheric pressure, or may be pressurized with a pressurizing element like a spring or a gas spring. Use of an accumulator, however, constrains the side of the cylinder in communication with the accumulator to be of the same pressure as the accumulator (i.e., the fluid pressure on the accumulator side of the cylinder is determined by the characteristics of the pressurizing element of the accumulator). Doing so limits the achievable differential pressures within the cylinder, which in turn limits the effective range of forces that may be provided by the cylinder. For example, in the case of an open accumulator (an accumulator pressurized by atmospheric pressure), the maximum pressure achievable on the accumulator side of the cylinder is atmospheric pressure, such that the maximum force that may be imposed on the piston in one direction is the product of the corresponding piston area and atmospheric pressure (i.e., when the fluid in the opposing fluid volume is in a vacuum condition). As a result, the cylinder provides only very small forces in one direction of actuation.

The magnitude of limiting force in this direction may be increased by pressuring the accumulator with a passive energy storage element (e.g., a spring). Use of a spring, however, requires that mechanical work be performed when storing fluid in the accumulator. Specifically, the piston cannot be moved from a fully extended to a fully retracted position without a force and amount of energy necessary to compress the spring. Further, as a result, the actuator will be characterized by a minimum energy configuration in which the rod is fully extended, and in the absence of other control elements, will move to that configuration. Thus, using an accumulator imposes significant constraints on actuator behavior, and limits achievable performance substantially.

To avoid the performance limitations associated with an accumulator in a closed hydraulic system, cylinder configurations may be employed that do not entail net fluid volume changes as a function of piston displacement. Examples of constant-fluid volume cylinder configurations include double-rod cylinders, rodless cylinders, and tandem cylinders.

Figure 1B:
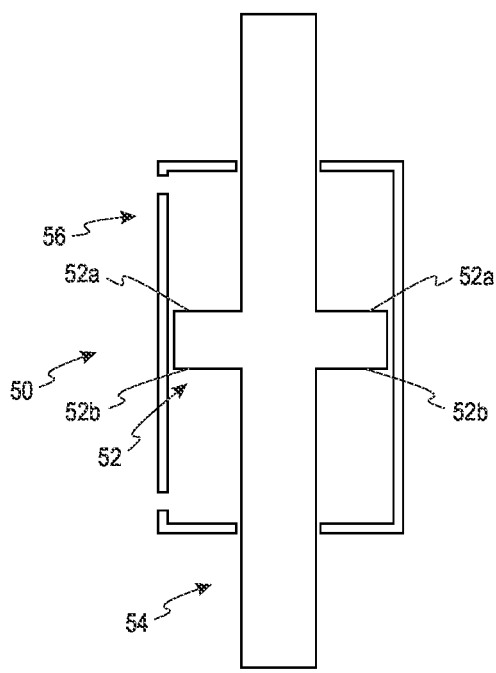
FIG. 1B is a prior art schematic drawing of a double-rod cylinder actuator.

A prior art double-rod cylinder actuator 50 is illustrated in FIG. 1B. The double-rod cylinder actuator 50 includes a piston 52 and a rod assembly 54. The rod assembly 54 extends from the piston 52 through an end of the cylinder 56 on both first and second sides 52a, 52b of the piston 52 and cylinder 56. Such cylinders remove the force and volume asymmetries that are present in the single-rod cylinder actuator 10 of FIG. 1A. However, the double-rod cylinder actuator of FIG. 1B requires a design envelope along the length of the cylinder of twice the piston stroke, and thus requires a considerably larger design envelope, relative to a single-rod cylinder actuator for the same nominal output characteristics. Additionally, rod seals containing both fluid volumes are exposed to fluid on one side and atmospheric pressure on the other resulting in maximum pressure differential and leak potential.

A rodless cylinder is another cylinder configuration that provides a constant fluid volume. Rather than using a piston rod that extends axially through an end of the cylinder to transmit power to an external point of attachment, a rodless cylinder incorporates a carriage attached to the piston laterally through the wall of the cylinder. This configuration provides constant fluid volume, but the nature of sealing along the length of the cylinder limits its use to very low pressures, relative to rod-type cylinders. Thus, performance with rodless cylinders is compromised substantially relative to rod-type cylinders.

Another cylinder actuator configuration that provides constant fluid volume is a tandem-cylinder configuration, which employs a pair of single-rod cylinder actuators where the first fluid volume of a first cylinder is in fluid communication with the second fluid volume of a second cylinder. The second fluid volume of the first cylinder is in fluid communication with the first fluid volume of the second cylinder. Given this configuration, retraction of a rod in the first cylinder is accompanied by extending the rod in the second cylinder. The coupled motion results in a constant fluid volume. In this configuration, only one of the two cylinders is used for actuation, while the other is used strictly to maintain a constant fluid volume. Thus, this configuration effectively doubles the size and weight of the actuation system.

To provide a constant fluid volume linear actuator without the size, weight, packaging, and/or performance penalties associated with the aforementioned actuators, alternative single-rod constant-volume hydraulic actuator (CVHA) designs have been proposed. Rather than incorporate two fluid chambers to contain the first and second volumes of working fluid, respectively, as is characteristic of prior art hydraulic cylinder actuators (see, e.g., FIGS. 1A and 1B), these CVHA designs incorporate multiple separable fluid chambers.

Figure 2A:
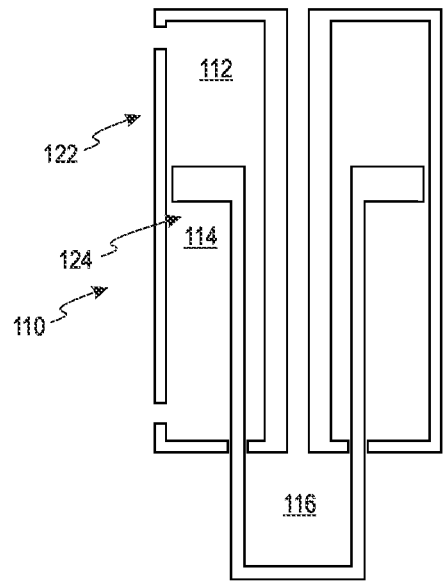
FIG. 2A is a prior art schematic drawing of a three-chamber cylinder actuator.
Figure 2B:
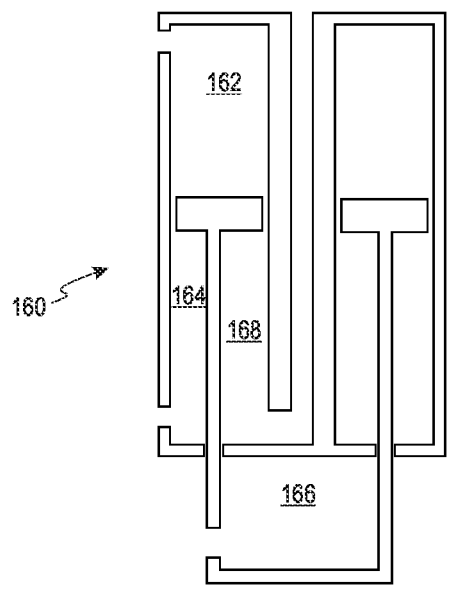
FIG. 2B is a prior art schematic drawing of a four-chamber cylinder actuator.

Specifically, the prior art multi-chamber cylinder actuators contain either three fluid chambers as depicted with prior art three-chamber cylinder actuator 110 of FIG. 2A, or four fluid chambers as depicted with prior art four-chamber cylinder actuator 160 of FIG. 2B. Examples of three-chamber designs were described by Habibi and Goldenberg 1999, Habibi and Goldenberg 2000, Habibi et al. 2006, while examples of four-chamber designs were described by Linjama et al. 2009, Linjama et al. 2015, Heybroek and Norlin 2015, Xiaoming et al. 2016. These multi-chamber cylinder actuators 110, 160 operate with first and second volumes of working fluid in which the first volume imposes an extending force on the piston and the second volume of working fluid imposes a retracting force on the piston.

To provide CVHA behavior, rather than use all cylinder chambers to contain working fluid, these cylinders are intended to operate utilizing a subset of three or four chambers to contain working fluid, while the remaining chambers are generally vented to atmosphere. Specifically, to provide CVHA behavior, these cylinders are utilized subject to the following two essential conditions, which together are referred to as "symmetry criteria": (1) pressurization of at least one chamber must extend the piston, while pressurization of at least one other chamber must retract it; and (2) the effective area of the piston in contact with fluid on the extension portion of the piston must equal the effective area of the piston in contact with fluid on the retraction portion. The term "effective area" indicates the piston area that will impose a force along the piston rod.

The prior art multi-chamber cylinder actuator 110 includes a first chamber 112, a second chamber 114 and a third chamber 116 as shown in FIG. 2A. The cylinder actuator includes a cylinder 122 and a piston 124. The working fluid in either the first chamber 112 or the third chamber 116 may extend the piston (i.e., can contain the first working fluid), while only working fluid in the second chamber 114 can retract the piston. Therefore, the second chamber 114 must always be used with the second working fluid. Although working fluid in both chambers 112 and 116 can extend the cylinder, it is not physically possible to establish equal piston areas between the chambers 112 and 114 due to the piston rod, since the area in the first chamber 112 will always be greater than the area of the second chamber 114.

Similarly, combining areas of the first chamber 112 and the third chamber 116 will also always be greater than the area of the second chamber 114. Thus, the only two working-fluid combination that will satisfy the symmetry criteria is to use the third chamber 116 for the first volume of working fluid (i.e., to extend the piston) and the second chamber 114 for the second volume of working fluid (i.e., to retract the piston), while the first chamber 112 is left vented to atmosphere. The piston 124 and cylinder 122 are designed such that piston areas exposed to the first fluid volume (i.e., the third chamber 116) are equal to the piston area exposed to the second fluid volume (i.e., the second chamber 114).

The prior art four-chamber cylinder actuator 160 includes a first chamber 162, a second chamber 164, a third chamber 166 and a fourth chamber 168 as shown in FIG. 2B. In the prior art four-chamber cylinder actuator (FIG. 2B), as in the three-chamber cylinder actuator 110, working fluid in either the first chamber 162 or the third chamber 166 can extend the piston (i.e., can contain the first working fluid). Although unlike the prior art multi-chamber cylinder actuator 110, both the second chamber 164 and the fourth chamber 168 can retract the cylinder (i.e., can contain the second working fluid). Since the summation of piston areas in chambers 164, 168 (the retraction chambers) will always be less than the first chamber 162, the symmetry criteria cannot be satisfied if the first chamber 162 contains working fluid (like in the prior art multi-chamber cylinder actuator 110). As such, the third chamber 166 must be used exclusively to contain the first volume of working fluid (i.e., for extension), while the second volume of working fluid (i.e., for retraction) can either be contained in the second chamber 164, the fourth chamber 168, or the combination thereof. Employing the combination of both the second and fourth chambers 164, 168 to contain the second volume of working fluid enables a smaller overall cylinder diameter since it more completely fills the rod-side of the cylinder with fluid.

Specifically, in addition to the conditions for symmetry previously stated, in order to provide a minimum-diameter solution, the cylinder must meet the "minimum-diameter" criterion. The minimum-diameter criterion requires that the second volume of working fluid fully occupy the rod-side of the piston. As such, the chief advantage of a four-chamber cylinder actuator relative to the three-chamber cylinder actuator is that it can satisfy both the symmetry criteria and the minimum-diameter criterion by using the third chamber 166 for the first volume of working fluid and the combination of the second and fourth chambers 164 and 168 for the second volume of working fluid. Employing both the third and fourth chambers 166, 168 to contain opposing working fluids, however, requires a more complex porting geometry since separate fluid access ports to both the third and fourth chambers 166, 168 in a compact space is a challenge (i.e., these ports would most likely be located in the center of the cylinder, which increases the cylinder diameter).

Further, if used for such porting, the center of the cylinder cross-section cannot be counted as part of the swept volume of the actuator, and therefore the minimum-diameter criterion is not truly met (i.e., the entirety of the rod-side of the piston is not exposed to the second volume of working fluid). Thus, the porting is a challenge and the theoretical advantage of the prior art four-chamber cylinder actuator relative to the prior art three-chamber cylinder actuator is not fully realized.

Inventive Cylinder Actuators

The present invention addresses the shortcomings of the prior art cylinder actuators. The inventive cylinder actuators may be used with hydraulic or pneumatic systems.

In one embodiment, a cylinder actuator includes a body assembly and a piston assembly. The body assembly includes a first cylinder nested concentrically within a second cylinder. The first cylinder includes a first end and a second end. The second cylinder includes a first end and a second end. The piston assembly slides linearly within the first and second cylinders of the body assembly. The piston assembly includes a first piston assembly end and a second piston assembly end.

The cylinders may have a generally circular or circular cross-section. The cylinder may also have a generally oval or oval cross-section. It is contemplated that the cylinder may have cross-sections with other shapes and still function as intended in the present invention.

The first piston assembly end includes a first piston and a second piston. The first piston is configured to move within the first cylinder. The second piston is configured to move within the second cylinder. The piston assembly further includes a first piston rod and a second piston rod. The first piston rod extends from the first piston through the first end of the first cylinder. The second piston rod extends from the second piston through the first end of the second cylinder. The first and second piston rods are joined at the second end of the piston rod assembly that is located outside of the first and second cylinders.

In one embodiment, the cylinder actuator includes four chambers in the first and second cylinders. In another embodiment, the cylinder actuator includes five chambers in which four of the chambers are included in the first and second cylinders. It is contemplated that the cylinder actuator may include more than five chambers. It is contemplated that the cylinder actuators may have different numbers of chambers in the first and second cylinders.

The cylinder actuators are typically made of metallic materials. Some non-limiting examples of metallic materials that may be used in forming the cylinder actuators of the present application include, but are not limited to, metals (e.g., aluminum, steel), plastics and glass. It is desirable in many applications to use metallic materials such as aluminum or steel.

Referring to FIGS. 3A, 3B, a schematic drawing of a five-chamber cylinder actuator is shown according to one embodiment of the present application. FIG. 3A and FIG. 3B are the same except FIG. 3B includes all of the references numbers. Specifically, FIGS. 3A and 3B depict a cylinder actuator 210 that includes a first chamber 212, a second chamber 214, a third chamber 216, a fourth chamber 218 and a fifth chamber 220. Thus, the cylinder actuator 210 has the potential to incorporate five potential fluid chambers.

The cylinder actuator 210 of FIG. 3B includes a body assembly 230 and a piston assembly 240. The body assembly 230 includes a first cylinder 232 and a second cylinder 234. The first cylinder 232 is nested concentrically within the second cylinder 234. The first cylinder includes a first end 232a and a second end 232b. The second cylinder 234 includes a first end 234a and a second end 234b.

The piston assembly 240 slides linearly within the first and second cylinders 232, 234. The piston assembly 240 includes a first piston assembly end 242 and a second piston assembly end 244. The first piston assembly end 242 includes a first piston 246, a second piston 248, a first piston rod 250 and a second piston rod 252. The first piston 246 moves within the first cylinder 232. The second piston 248 moves within the second cylinder 234. The first piston rod 250 extends from the first piston 246 through the first end 232a of the first cylinder 232. The second piston rod 252 extends from the second piston 248 through the first end 234a of the second cylinder 234. The piston assembly 240 is joined at the second piston rod assembly end 244 that is located outside of the first and second cylinders 232, 234. The cylinder actuator 210 includes a port 256 that accesses the first chamber 212, a port 258 that accesses the second chamber 214, a port 260 that accesses the third chamber 216, a port 264 that accesses the fourth chamber 218 and a port 262 that accesses the fifth chamber 220.

The inclusion of five chambers enables the first and second volumes of working fluid to be contained within a combination of chambers that satisfies both the above described (1) symmetry conditions of a constant-volume hydraulic actuator (CVHA) and (2) minimum diameter condition for a CVHA without requiring use of the third chamber 216 that raises substantial challenges associated with fluid porting. Specifically, it is a fundamental physical requirement that both the prior art cylinder actuators 110, 160 use a respective third chamber 116, 166 for the first volume of working fluid to satisfy the symmetry condition.

The cylinder actuator 210 of FIGS. 3A, 3B, on the other hand, provides multiple solutions to satisfy the symmetry condition without needing a third chamber to contain working fluid. This avoids requiring a port access to the third chamber with a moving port (relative to the cylinder), which is undesirable for many reasons and also requires access through a center portion of the cylinder, which is undesirable for other reasons.

The five-chamber cylinder actuator (e.g., cylinder actuator 210) also enables full realization of a minimum-diameter cylinder since the center of the cylinder is not needed for porting. Meeting the minimum diameter criterion requires combining both the second and fourth chambers 214, 218 for the second volume of working fluid (i.e., to retract the piston) in the five-chamber cylinder actuators. This is also the case with the prior art cylinder actuator 160 described above using its second and fourth chambers 164, 168.

Unlike the prior art cylinder actuators 110, 160, however, the symmetry requirement in the five-chamber cylinder actuator 210 can be satisfied using strictly the first chamber 212 or strictly the fifth chamber 220 to balance the piston area associated with the second and fourth chambers 214, 218 without needing the third chamber 216. The result is a minimum diameter design with much simpler porting, in addition to a smaller diameter solution than that provided by either prior art cylinder actuator 110, 160.

The five-chamber cylinder actuators have several possible variants in which each has a different combination of chambers for extension and retraction, respectively. The variants of the five-chamber cylinder actuator that meet the previously described symmetry conditions are listed in Table 1 below. In a typical embodiment, the chambers that are not associated with the first or second volumes of working fluid are vented to atmosphere.

Combinations of chambers that satisfy the symmetry condition are noted using, for example, the reference numbers of the five-chamber cylinder actuator of FIGS. 3A, 3B. It is noted that these chambers may be used in other embodiments other than FIGS. 3A, 3B.

TABLE 1

| Variant Number | Extension Chambers (first fluid volume chambers) | Retraction Chambers (second fluid volume chambers) |
| --- | --- | --- |
| 1 | 220 | 214 |
| 2 | 216 | 214 |
| 3 | 220, 216 | 214 |
| 4 | 220 | 214, 216 |
| 5 | 216 | 214, 220 |
| 6 | 212 | 218 |
| 7 | 212 | 214, 218 |
| 8 | 212, 214 | 218 |
| 9 | 212, 218 | 214 |
| 10 | 216 | 214, 218 |
| 11 | 216, 214 | 218 |
| 12 | 216, 218 | 214 |
| 13 | 220 | 214, 218 |
| 14 | 220, 214 | 218 |
| 15 | 220, 218 | 214 |
| 16 | 216, 220 | 214, 218 |
| 17 | 216 | 214, 218, 220 |
| 18 | 220 | 214, 218, 216 |
| 19 | 216, 220, 214 | 218 |
| 20 | 216, 220, 218 | 214 |
| 21 | 216, 214 | 218, 220 |
| 22 | 220, 214 | 218, 216 |

Of the variants listed in Table 1 above, Variants 1, 2, and 6 utilize strictly single chambers. Variants 7, 10, 13, and 16 satisfy the previously described minimum diameter condition. Variants 2-5, 10-12, and 16-22 require using the third chamber and, therefore, entail the associated porting challenges. Variants 8-9, 11-12, 14-15, and 17-22 are subtractive meaning that the same fluid imposes both extension and retraction forces on the piston. Given these considerations, some desirable embodiments of the five-chamber cylinder actuator are Variant 1, which enables a simple porting embodiment, and Variants 7 and 13, both of which enable a minimum-diameter realization without requiring the use of the third chamber and its associated porting challenges.

The combination of the body assembly and piston assembly establishes five separable fluid chambers: (1) a first fluid chamber 212 defined by the annular space between a first cylinder wall 270 and a second cylinder wall 272 that exists between the second piston 248 and the second end 232b of the second cylinder 234; (2) a second fluid chamber 214 defined by the annular space between the first cylinder wall 270 and second cylinder wall 272 that exists between the second piston 248 and the first end 232a of the second cylinder 234; (3) a third fluid chamber 216 defined by the annular space within wall 274 of the second piston rod between the first end 232a of the first cylinder 232 and the second piston rod assembly end 244; (4) a fourth fluid chamber 218 defined by the annular space within the first cylinder wall 270 between the first piston 246 and the first end 232a of the first cylinder 232; and (5) a fifth fluid chamber 220 defined by the space within the first cylinder wall 270 between the first piston 246 and the second end 232b of the first cylinder 232.

In several actuator variants (i.e., Variants 3-5, 7-22 in Table 1), at least two of the five chambers are configured to be in fluid communication. In general, chambers that are not used to contain working fluid to effect extension or retraction are vented to atmosphere.

As previously mentioned, the prior art three- and four-chamber cylinder actuators require using a third chamber to meet the symmetry condition (i.e., to have a constant-volume cylinder). The third chamber is difficult to utilize, however, because it either requires a moving port (relative to the body assembly), or requires porting through a center section of the body assembly, which complicates construction of the cylinder and reduces the effective piston area used for retraction.

The five-chamber cylinder actuator enables satisfaction of the symmetry condition without the need for the third chamber (i.e., the third chamber 216). Thus, certain embodiments of the five-chamber cylinder actuator do not use the third chamber for either working fluid. In these embodiments, the third chamber is typically vented to atmosphere. In these particular embodiments, only four of the chambers may be used to contain the first and second volumes of working fluid. However, unlike the prior art four-chamber cylinder actuator, all chambers in these particular embodiments are contained within the cylinder, as opposed to the four chambers of the four-chamber cylinder actuator 160 of FIG. 2B in which three chambers are contained within the cylinder and one outside the first and second cylinders.

Figure 4B:
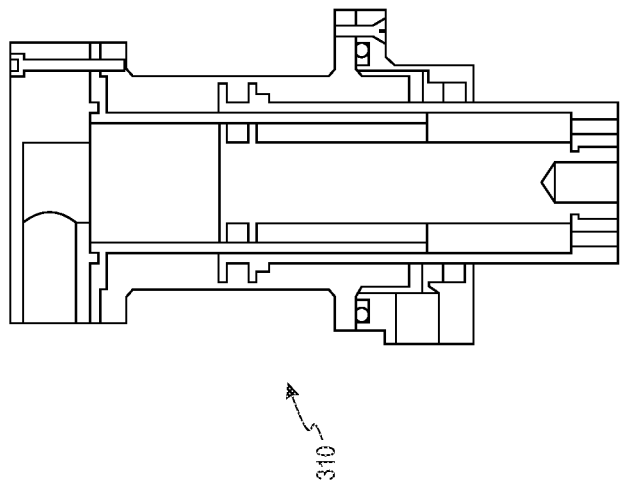
FIG. 4B is a solid model implementation of the five-chamber cylinder actuator of FIG. 4A.

One desired embodiment of the five-chamber cylinder actuator is listed in Table 1 as Variant 1. Variant 1 enables perhaps the simplest porting configuration. In Variant 1, the first volume of working fluid (the first fluid volume) is contained exclusively within the fifth chamber 220, while the second volume of working fluid (the second fluid volume) is contained exclusively within the second chamber 214. To satisfy the symmetry criteria, the piston area of the first fluid volume in the fifth chamber 220 is equal to the piston area of the second fluid volume in the second chamber 214. A schematic and design embodiment for Variant 1 is shown in FIGS. 4A and 4B.

Figure 4A:
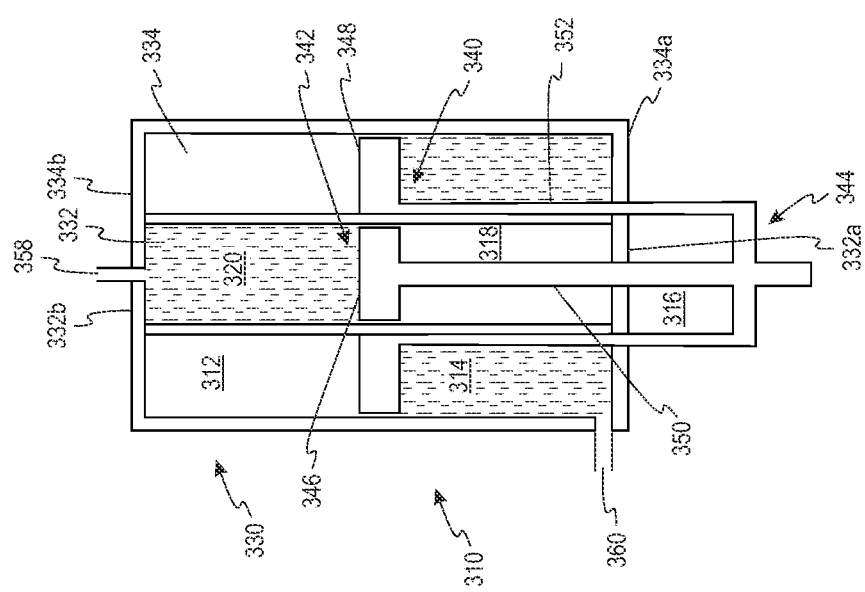
FIG. 4A is a schematic drawing of a five-chamber cylinder actuator according to one embodiment (identified as Variant 1 in Table 1) of the present application.

FIG. 4A is a schematic drawing of a five-chamber cylinder actuator 310 according to one embodiment. FIG. 4B is a solid model of an implementation of the five-cylinder actuator 310 of FIG. 4A.

Referring back to FIG. 4A, the five-chamber cylinder actuator 310 includes a first chamber 312, a second chamber 314, a third chamber 316, a fourth chamber 318 and a fifth chamber 320. The fifth chamber 320 includes a first fluid volume and the second chamber 314 includes a second fluid volume.

The cylinder actuator 310 of FIG. 4A includes a body assembly 330 and a piston assembly 340. The body assembly 330 includes a first cylinder 332 and a second cylinder 334. The first cylinder 332 has a first end 332a and a second end 332b. The first cylinder 334 has a first end 334a and a second end 334b. The piston assembly 340 includes a first piston assembly end 342 and a second piston assembly end 344. The piston assembly 340 also includes a first piston 346, a second piston 348, a first piston rod 350 and a second piston rod 352.

The five-chamber cylinder actuator 310 includes a first fluid port 358 and a second fluid port 360. The first fluid port 358 is located in or near the second end 332b of the first cylinder 332 and enables fluid communication between an external apparatus and the first fluid volume in the fifth chamber 320. The second fluid port 360 is located in or near the first end 334a of the second cylinder 334 and enables fluid communication between an external apparatus and the second fluid volume in the second chamber 314.

Figure 5A:
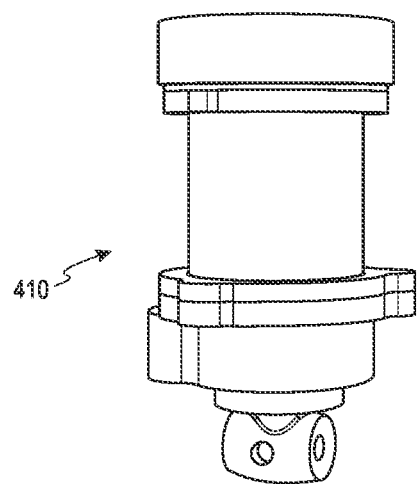
FIG. 5A is a side view of a constant-volume hydraulic actuator (CVHA) prototype in a retracted position according to one embodiment of the present application.
Figure 5B:
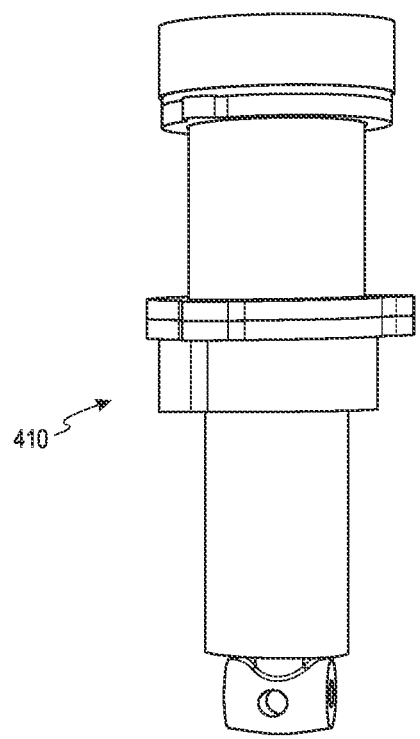
FIG. 5B is a side view of the CVHA prototype of FIG. 5A in an extended position.

FIG. 5A shows a side view of a constant-volume hydraulic actuator (CVHA) prototype 410 in a retracted position according to one embodiment. This will be discussed further below in the Examples. FIG. 5B shows a side view of the CVHA prototype 410 of FIG. 5A in an extended position.

Figure 6:
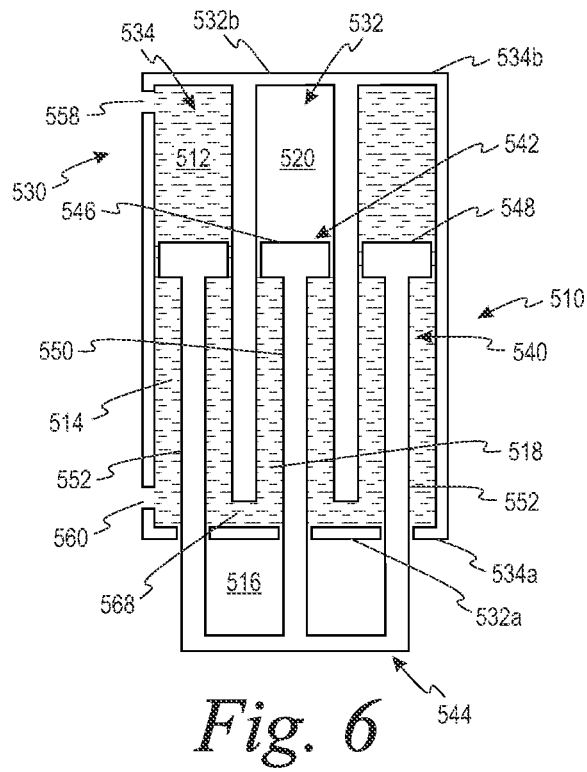
FIG. 6 is a schematic drawing of a five-chamber cylinder actuator according to another embodiment (identified as Variant 7 in Table 1).

Referring to FIG. 6, a five-chamber cylinder actuator 510 according to another embodiment (identified as Variant 7 in Table 1) is shown. The five-chamber cylinder actuator 510 includes a first chamber 512, a second chamber 514, a third chamber 516, a fourth chamber 518 and a fifth chamber 520.

The cylinder actuator 510 of FIG. 6 includes a body assembly 530 and a piston assembly 540. The body assembly 530 includes a first cylinder 532 and a second cylinder 534. The first cylinder 532 has a first end 532a and a second end 532b. The first cylinder 534 has a first end 534a and a second end 534b. The piston assembly 540 includes a first piston assembly end 542 and a second piston assembly end 544. The piston assembly 540 also includes a first piston 546, a second piston 548, a first piston rod 550 and a second piston rod 552.

The five-chamber cylinder actuator 510 includes a first fluid port 558 and a second fluid port 560. The first fluid port 558 is located in or near the second end 534b of the second cylinder 534 and enables fluid communication between an external apparatus and the first fluid volume in the first chamber 512. The second fluid port 560 is located in or near the first end 534a of the second cylinder 534 and enables fluid communication between an external apparatus and the second fluid volume in the second chamber 514.

Figure 6A:
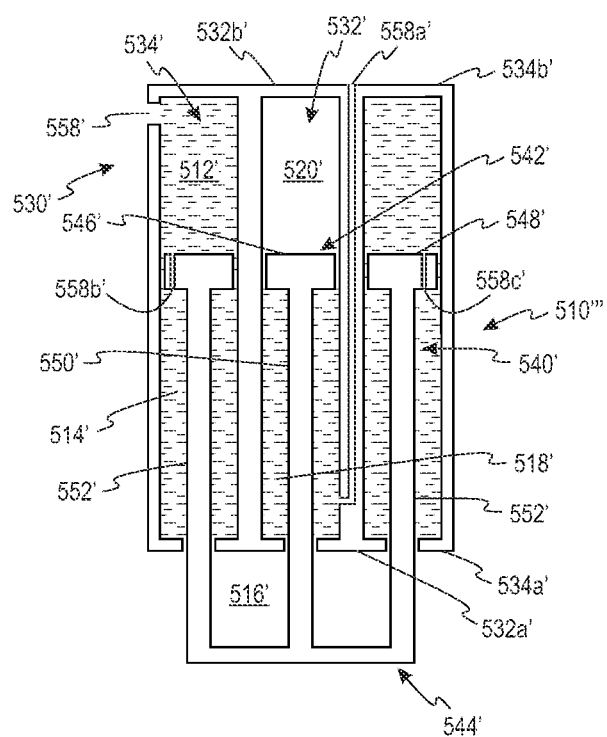
FIG. 6A is a schematic drawing of a five-chamber cylinder actuator according to another embodiment (identified as Variant 8 in Table 1).

Referring to FIG. 6A, a five-chamber cylinder actuator 510''' according to another embodiment (identified as Variant 8 in Table 1) is shown. The five-chamber cylinder actuator 510''' includes a first chamber 512', a second chamber 514', a third chamber 516' a fourth chamber 518' and a fifth chamber 520'.

The cylinder actuator 510''' of FIG. 6A includes a body assembly 530' and a piston assembly 540'. The body assembly 530' includes a first cylinder 532' and a second cylinder 534'. The first cylinder 532' has a first end 532a' and a second end 532b'. The first cylinder 534' has a first end 534a' and a second end 534b'. The piston assembly 540' includes a first piston assembly end 542' and a second piston assembly end 544'. The piston assembly 540' also includes a first piston 546', a second piston 548', a first piston rod 550' and a second piston rod 552'.

The five-chamber cylinder actuator 510''' includes a first fluid port 558' and a second fluid port 558a'. The first fluid port 558' is located in or near the second end 534b' of the second cylinder 534' and enables fluid communication between an external apparatus and the first fluid volume in the first chamber 512'. The second fluid port 558a' is located in or near the second end 532b' of the first cylinder 532' and enables fluid communication between an external apparatus and the second fluid volume in the fourth chamber 518'. The first chamber 512' is in fluid communication with the second chamber 514' via ports or openings 558b', 558c' formed in the second piston 548'.

Figure 7:
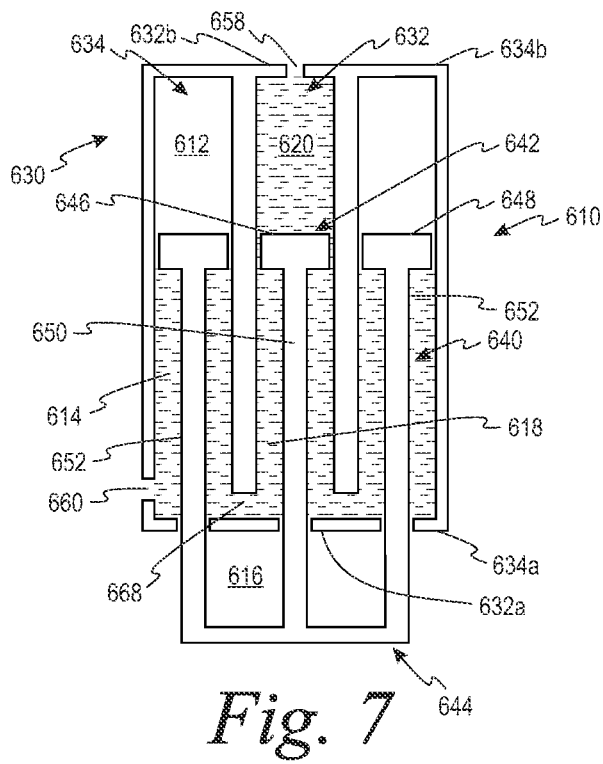
FIG. 7 is a schematic drawing of a five-chamber cylinder actuator according to a further embodiment (identified as Variant 13 in Table 1).

FIG. 7 shows a schematic depiction of a five-chamber cylinder actuator 610 according to a further embodiment (identified as Variant 13 in Table 1). The five-chamber cylinder actuator 610 includes a first chamber 612, a second chamber 614, a third chamber 616, a fourth chamber 618 and a fifth chamber 620.

The cylinder actuator 610 of FIG. 7 includes a body assembly 630 and a piston assembly 640. The body assembly 630 includes a first cylinder 632 and a second cylinder 634. The first cylinder 632 has a first end 632a and a second end 632b. The first cylinder 634 has a first end 634a and a second end 634b. The piston assembly 640 includes a first piston assembly end 642 and a second piston assembly end 644. The piston assembly 640 also includes a first piston 646, a second piston 648, a first piston rod 650 and a second piston rod 652.

The five-chamber cylinder actuator 610 includes a first fluid port 658 and a second fluid port 660. The first fluid port 658 is located in or near the second end 632b of the first cylinder 632 and enables fluid communication between an external apparatus and the first fluid volume in the fifth chamber 620. The second fluid port 660 is located in or near the first end 634a of the second cylinder 634 and enables fluid communication between an external apparatus and the second fluid volume in the second chamber 614.

The five-chamber cylinder actuators 510, 610 of FIGS. 6 and 7 satisfies the minimum diameter condition (i.e., rod-side of the piston fully filled with the second volume of working fluid). Specifically, the five-chamber cylinder actuators 510, 610 employ the combination of the second and fourth chambers in fluid communication to contain the second fluid volume and thus retract the piston. The five-chamber cylinder actuator 510 employs exclusively the first chamber 512 to contain the first fluid volume, while the five-chamber cylinder actuator 610 employs exclusively the fifth chamber 520 to contain the first fluid volume.

In these embodiments, fluid communication is provided between the second and fourth chambers and the second piston rod employs an annular cross-section. In this embodiment, the outer diameter of the annular cross-section of the second piston rod is sufficiently smaller than the outer diameter of the annular cross-section of the second cylinder, and the inner diameter of the annular cross-section of the second piston rod is sufficiently larger than the inner diameter of the annular cross-section of the second cylinder, such that fluid in the second chamber can flow within the annular space between the second piston rod and the outer diameter of the second cylinder, and within the annular space between the second piston rod and the inner dimeter of the second cylinder. Further, the annular second piston rod contains at least one opening through the rod, near or adjacent to the second piston, which allows fluid continuity within the second chamber across the second piston rod.

Additionally, the first cylinder, which separates the second and fourth chambers contains at least one opening through the wall of the first cylinder near the first end of the first cylinder, which allows fluid communication between the second and fourth chambers. This embodiment of fluid communication between the second and fourth chambers is illustrated in FIGS. 6 and 7.

In these embodiments, the fluid communication between second and fourth chambers can be provided differently. That is, rather than employ an annular second piston rod, the five-chamber actuator can employ a second piston rod assembly comprised of at least two separate piston rods which are spaced evenly around the annular cross-section of the second piston. In some cases, three piston rods can be used. In this embodiment, rather than a single fluid seal around the inner and outer diameter of the annular second piston rod, each of the separate piston rods in the second piston rod assembly employs a separate rod seal as it passes through the first end of the second cylinder.

Finally, at least one opening in the first cylinder wall near the first end of the cylinder completes the fluid communication between the second and fourth chambers. This embodiment is not transferrable to a three or four chamber cylinder design, since this embodiment requires that the third chamber to be open to atmosphere (i.e., sealing the third chamber from atmosphere requires an annular second piston rod). In other words, the piston rod assembly of at least two rods can only be employed if the third chamber is not employed as a pressurized chamber. Since three and four chamber cylinder actuators require using the third chamber to satisfy the symmetry condition, the "separate rod" embodiment of the second piston rod is only applicable to the five-chamber cylinder design described here.

In other embodiments, an annular second piston rod may separate the second chamber into an inner chamber between the second piston rod and the inner diameter of the annular cross-section of the second cylinder, and an outer chamber between the second piston rod and the outer diameter of the annular cross-section of the second cylinder, effectively creating a six chamber actuator. This could be done with the second chamber 514 in FIG. 6. The simplest embodiment of this type allows fluid communication between the inner chamber and the fourth chamber such that a single fluid port may be used to provide access to the chambers. The utilization of a sixth chamber increases the number of variants that satisfy the symmetry conditions. However, these variants are generally not as desirably as the five chamber variants. Six chamber variants comprise subtractive configurations that increase the complexity of fluid porting and cylinder design.

In other embodiments, an annular second piston rod may establish a chamber between the second piston rod and the inner diameter of the second cylinder, and another chamber between the second piston rod and the outer diameter of the first cylinder, effectively creating a six chamber actuator. The simplest embodiment of this type allows fluid communication between this sixth chamber and the fourth chamber such that a single fluid port may be used to provide access to the chambers. The utilization of a sixth chamber increases the number of variants that satisfy the symmetry conditions. However, these variants are generally not as desirably as the five chamber variants. Six chamber variants comprise subtractive configurations that increase the complexity of fluid porting and cylinder design.

In some embodiments, a cylinder in accordance with the various embodiments may be configured to provide bidirectional damping between first and second mechanical members that move relative to each other. In such embodiments, the body assembly can be connected mechanically to a first member and the piston assembly to a second member in which the second member moves relative to the first. In this bidirectional damping configuration, the first and second cylinder ports are configured to be in fluid connection through a fluidic restriction. In certain embodiments, the fluidic restriction is a hydraulic valve that can vary the resistance to fluid flow based on a mechanical or electro-mechanical adjustment.

In these embodiments, the fluid volume contained within the hydraulic valve is invariant as a function of the valve fluidic resistance adjustment, such as would be the case for a ball valve or spool valve. In this embodiment, as the first member moves relative to the second member, the piston assembly slides within the body assembly, and working fluid moves from the first volume of working fluid through the fluidic restriction to the second volume of working fluid, or in the reverse direction, depending on the direction of piston movement. Fluid moving through the fluidic restriction creates a pressure difference between the first and second volumes of working fluid, which imposes a resistive force on the piston assembly, which in turn imposes a damping force between the first and second members.

If a prior art single-rod cylinder actuator, such as that in FIG. 1A, were used instead in this configuration, the change in volume of fluid in the closed circuit, resulting from the piston rod, would prevent the piston from moving in the retraction direction. This would create a vacuum when moved in the extension direction and therefore would not provide the desired damping behavior in either movement direction. This deficiency could be addressed by incorporating a fluid accumulator on the rod-side of the cylinder, but in that case, the pressure in the second fluid volume would be restricted to the accumulator pressure. Thus, this configuration would only provide damping in the direction of rod retraction, assuming the accumulator is configured to operate at atmospheric pressure. If the accumulator is configured to operate at a higher pressure, retraction of the piston rod would require a retraction force associated with the energy required to move fluid into the accumulator, and therefore the actuator would not provide the desired damping behavior. Therefore, there is no simple configuration in which a standard single-rod cylinder can provide bidirectional damping. These deficiencies can be rectified by using a double-rod cylinder actuator, although as previously discussed, a double-rod cylinder is often difficult to mechanically configure between the first and second members.

In these applications, the five-chamber cylinder actuator of the various embodiments enables full bi-directional damping (unlike the prior art single-rod cylinder actuator), but with a simplified mounting configuration (unlike the prior art double-rod cylinder actuator).

Figure 8:
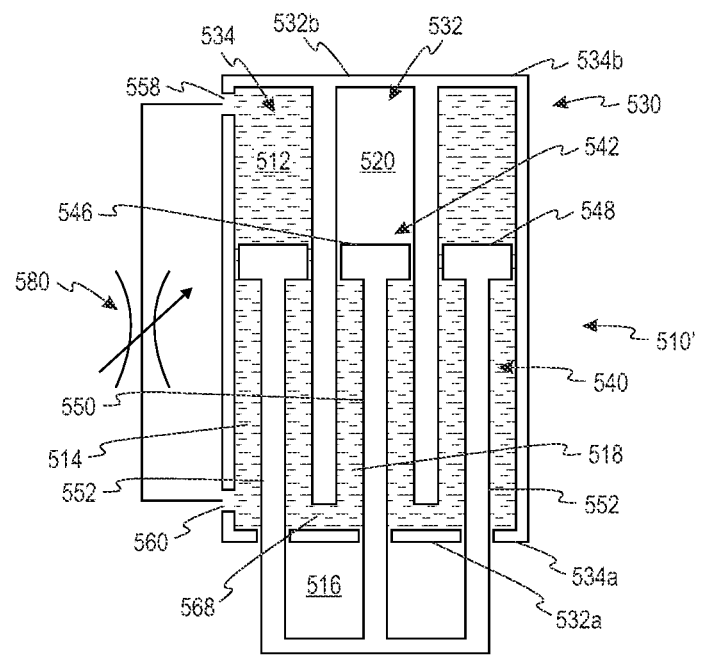
FIG. 8 is a schematic drawing of the five-chamber cylinder actuator of FIG. 6 further including a bidirectional damping or a hydraulic lock configuration according to one embodiment of the present application.

A schematic of the five-chamber cylinder actuator 510' is shown in FIG. 8 with a bidirectional damping apparatus 580. The cylinder actuator 510' is identical to the cylinder actuator 510 except for the addition of the bidirectional damping apparatus 580.

It is contemplated that the bidirectional damping apparatus may be used in other cylinder actuators. For example, a bidirectional damping apparatus may be used with the cylinder actuator 610 of FIG. 7. It is contemplated that the bidirectional damping apparatus may be used in other embodiments.

Another feature of the bidirectional damping configuration is the ability to obtain a bidirectional hydraulic lock when the flow restriction between the first and second ports is closed completely. Specifically, the piston assembly can be locked at any position along the cylinder body by closing the flow restriction. Such bidirectional locking behavior is not achievable with the conventional single-rod cylinder actuator due to considerations previously discussed.

In some implementations of the five-chamber cylinder actuator of the various embodiments, the cylinder can be configured to provide powered linear movement between first and second mechanical members that move relative to each other. In such configurations, the body assembly is connected mechanically to a first member and the piston assembly to a second member. The second member moves relative to the first, and the cylinder is configured with a rotary actuator or motor that actively drives the piston assembly through retraction and extension via a power screw located within the piston rod assembly.

Figure 9A:
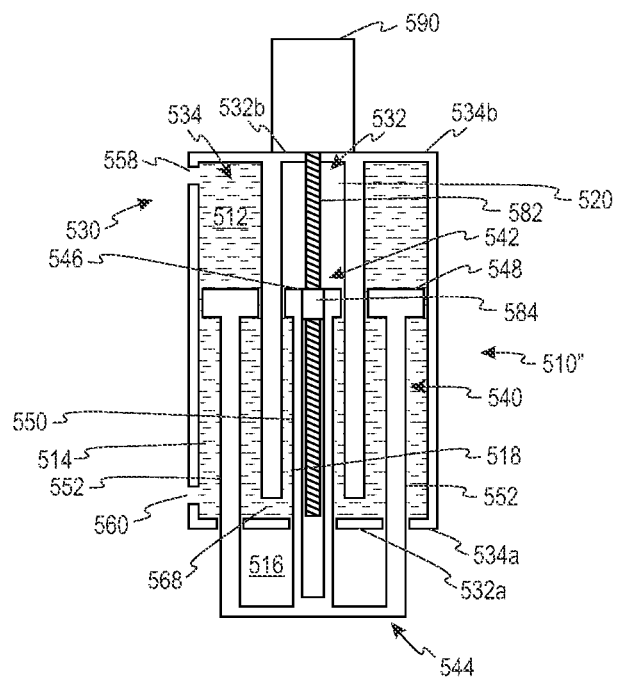
FIG. 9A is a schematic drawing of the five-chamber cylinder actuator of FIG. 6 further including a semi-powered configuration according to one embodiment of the present application.
Figure 9B:
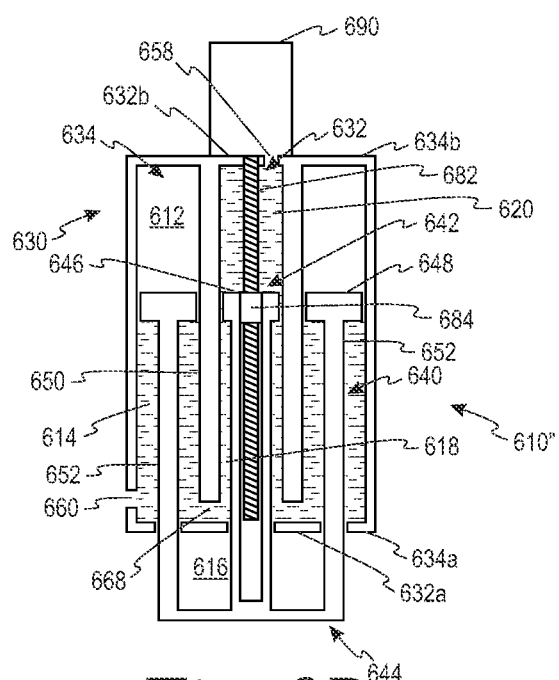
FIG. 9B is a schematic drawing of the five-chamber cylinder actuator of FIG. 7 further including a semi-powered configuration according to one embodiment of the present application.

Such embodiments are shown in FIGS. 9A, 9B. FIG. 9A shows a five-chamber cylinder actuator 510" using the configuration of the cylinder actuator 510 of FIG. 6 with the addition of a motor 590, a power screw 582 and a power screw nut 584. The housing of the motor 590 is mounted to the body assembly 530. The motor may be a rotary motor. It is contemplated that other motors may be used.

A shaft of the motor 590 drives the power screw 582 (e.g., lead screw, ball screw, roller screw, etc.). The power screw nut 584 is mounted within a piston assembly and a piston rod is configured to encompass the power screw 584. The power screw 582 requires a feature that prevents the piston assembly from rotation, which can either be implemented within the cylinder, or more commonly is embodied within the design constraints that connect the cylinder actuator and the first and second members. In a desired embodiment, the power screw 582 is backdrivable such that movement of the piston drives the screw in rotation, just as rotation of the screw drives the piston in translation.

FIG. 9B shows a five-chamber cylinder actuator 610" using the configuration of the cylinder actuator of FIG. 7 with the addition of a motor 690, a power screw 682 and a power screw nut 684. The housing of the motor 690 is mounted to the body assembly 630. The motor may be a rotary motor. It is contemplated that other motors may be used.

A shaft of the motor 690 drives the power screw 682 (e.g., lead screw, ball screw, roller screw, etc.). The power screw nut 684 is mounted within a piston assembly and a piston rod is configured to encompass the power screw 684. The power screw 682 requires a feature that prevents the piston assembly from rotation, which can either be implemented within the cylinder, or more commonly is embodied within the design constraints that connect the cylinder actuator and the first and second members. In a desired embodiment, the power screw 682 is backdrivable such that movement of the piston drives the screw in rotation, just as rotation of the screw drives the piston in translation.

It is contemplated that motor-powered aspect in FIGS. 9A, 9B may be used in all of the other variants of Table 1.

This configuration would be difficult to implement with the prior art double-rod cylinder actuator 50 of FIG. 1B, and therefore obtaining constant-volume properties in a motor-powered actuator would be challenging. This type of motor-powered configuration could be implemented in a prior art single-rod cylinder actuator (e.g., the prior art cylinder actuator 10 of FIG. 1A), but the system would of course not provide the constant-volume property. Further, when used with the prior art single-rod cylinder actuator 10 of FIG. 1A, this configuration would require a shaft seal where the rotary motor shaft and lead screw pass through the first end of the cylinder body.

As is well known to those skilled in the art of hydraulic systems, rotary shaft seals are far less desirable than linearly sliding seals, since rotary seals limit fluid pressures and introduce more friction, relative to linear sliding seals. In, for example, the cylinder actuator 510', a motor-powered configuration seals the second fluid volume from the motor at the first piston with a linear seal, and therefore does not require the use of a rotary shaft seal to keep working fluid from the motor.

In the case of a prior art single-rod cylinder actuator, a rotary shaft seal would be required to seal the first fluid volume of working fluid from the motor, and therefore would limit fluid pressures and introduce undesirable frictional characteristics on the motor shaft.

In other desired embodiments, it might be desirable to have a motor-driven constant-volume cylinder with working fluid around the power screw for purposes of power screw lubrication. This may be employed in cylinder actuator 610" of FIG. 9B. The rotary motor in FIGS. 9A and 9B may alternatively be located in a different orientation and could drive the power screw through a standard rotary transmission (e.g., gears, belt, chain, etc.).

In some implementations of the five-chamber cylinder actuator according to the various embodiments, the cylinder is used impose bidirectional damping between first and second mechanical members that move relative to each other, and also to provide powered linear movement between them. The same configuration can also impose a bidirectional lock when the fluidic restriction is closed. This configuration essentially combines the bidirectional damping and hydraulic lock configuration (e.g., FIG. 8) with the motor-driven configuration (e.g., FIG. 9A) to form the combined configuration shown schematically in cylinder actuator 510" of FIG. 10. The cylinder actuator 510" of FIG. 10 includes a second motor 592 that adjusts the fluidic resistance of the valve.

Figure 10:
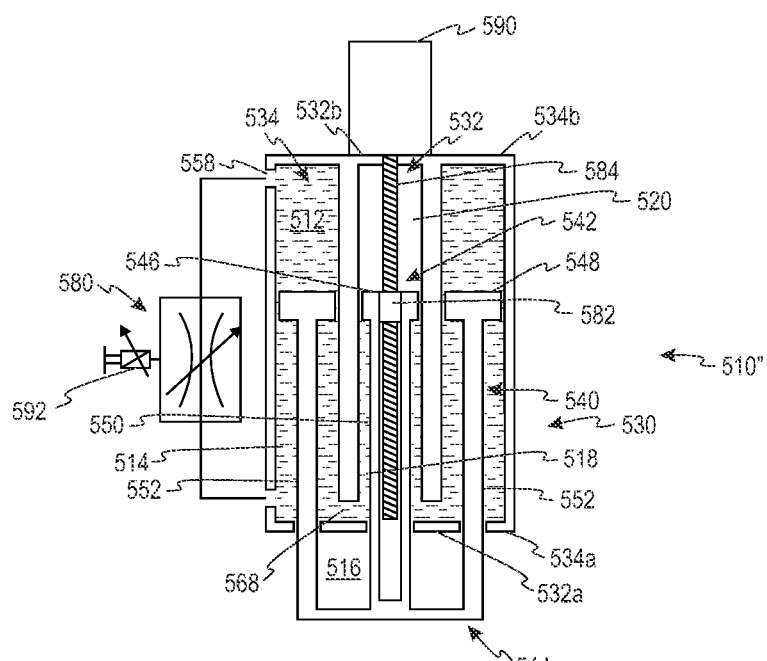
FIG. 10 is a schematic drawing of the five-chamber cylinder actuator of FIG. 6 further including bidirectional damping, a hydraulic lock, and semi-powered functionality according to one embodiment of the present application.

This combined configuration may also be easily extended to the other actuator variants. In such embodiments, the body assembly is connected mechanically to a first member and the piston assembly to a second member, where the second member moves relative to the first. The housing of the rotary motor 590 is mounted to the body assembly 530; the shaft of the motor 590 drives a power screw 582 (e.g., lead screw, ball screw, roller screw, etc.); and the power screw nut 584 is mounted within the piston assembly, as shown in FIG. 10. The use of the power screw requires a feature that prevents the piston assembly from rotation, which can either be implemented within the cylinder, or more commonly is embodied within the design constraints that connect the cylinder actuator and the first and second members.

Additionally, the first and second cylinder ports are configured to be in fluid connection through a fluidic restriction. In certain embodiments, the fluidic restriction is a hydraulic valve that can vary the resistance to fluid flow based on a mechanical or electromechanical adjustment. In these particular embodiments, the fluid volume contained within the hydraulic valve is invariant as a function of the valve fluidic resistance adjustment, such as would be the case for a ball valve or spool valve.

Such embodiments enable a spectrum of functionality including: (1) bidirectional powered linear movement via the motor and power screw; (2) bidirectional damping via the constant-volume fluid movement through the fluidic restriction; and (3) bidirectional hydraulic locking via closing of the fluidic restriction. This configuration is particularly useful when an application is characterized by relatively low-power and low-torque power generation requirements, which can be provided by the rotary motor; high-power and high-torque bidirectional power dissipation requirements. This may be implemented by leveraging the high power and torque density of hydraulic actuation and high-force bidirectional locking requirements at arbitrary positional configurations. This configuration also has the desirable characteristics of efficient and high-fidelity control of power dissipation, and ensures passivity when dissipating power, which is not guaranteed when dissipation power through feedback-controlled powered actuators.

Figure 11C:
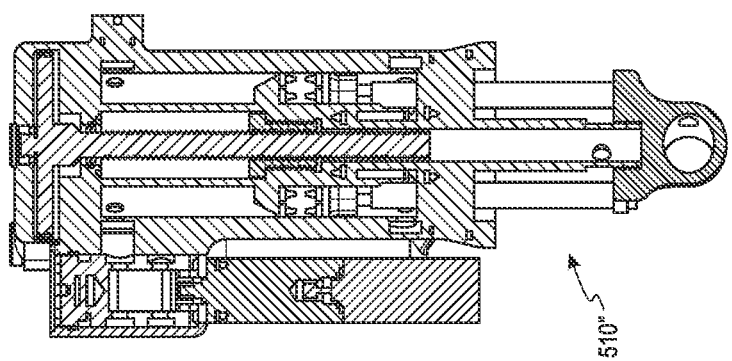
FIG. 11C is a cross-sectional view of FIG. 11A taken generally through a hydraulic valve axis.
Figure 11B:
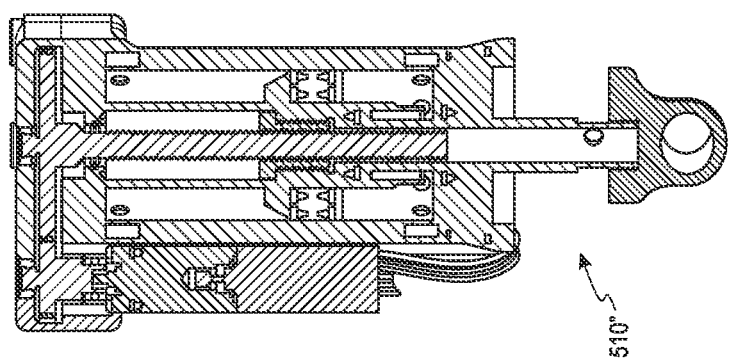
FIG. 11B is a cross-sectional view of FIG. 11A taken generally through a motor-driven axis.
Figure 11A:
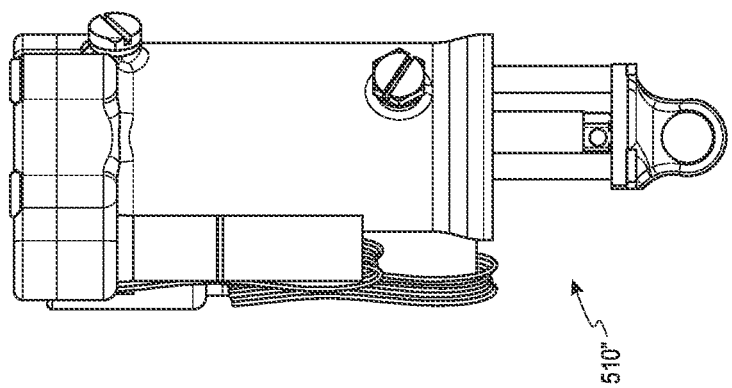
FIG. 11A is a side view of the five-chamber cylinder actuator of FIG. 6 in a motor-driven actuator configuration with bidirectional damping and a hydraulic lock according to one embodiment.

The schematic system shown in FIG. 10 may be embodied as shown in the design of FIGS. 11A-C. Specifically, FIGS. 11A-C show a motor-driven cylinder actuator 510" with bidirectional variable damping and hydraulic lock using the cylinder actuator configuration of FIG. 10. In the design of FIGS. 11A-C, the annular second piston rod takes the form of three separate piston rods, as previously discussed, such that the second and fourth chambers are largely in fluid communication with each other.

FIG. 11A is a side view of the motor-driven cylinder actuator 510". FIG. 11B shows a cross-section of the actuator system generally through the motor and power screw of the subsystem that provides bidirectional powered linear movement of the piston. The motor is mounted to the side of the piston, and drives the power screw (in this case a backdrivable lead screw) through a set of involute gears. FIG. 11C shows a cross-section of the actuator system generally through the controllable valve and cylinder piston. Here, a valve motor (separate from the drive motor) controls the valve restriction proportionally between fully open and fully closed. This system provides bidirectional damping via the constant-volume fluid movement through the fluidic restriction (i.e., through the valve).

In certain embodiments previously described above, the actuator configuration employs two motors: a first motor that drives the power screw, and a second motor that controls the fluidic resistance of the adjustable fluidic restriction. In such embodiments, the actuator configuration can employ at least a first control state and a second control state. The first control state corresponds to force control during power generation, and the second control state corresponds to force control during power dissipation.

In some of these embodiments, the first or second control state is selected via a supervisory control scheme. In other embodiments, the first or second control state may be selected as a function of the direction of the measured velocity (between the first and second attachment points) and the direction of the desired force.

When the first control state is selected, the first motor is used to exert the desired controllable force between the first and second attachment points via established open-loop or feedback control techniques, while the second motor is employed to configure the valve for the minimum amount of fluidic restriction (i.e., to the maximum valve opening). When the second control state is selected, the first motor is de-energized, while the second motor is used to servo the hydraulic valve to provide the desired controllable force between the first and second attachment points via established open-loop or feedback control techniques. The control method may also include a third control state, which corresponds to a locked state. When in the third control state, the first motor is de-energized, while the second motor is configured to close the fluidic restriction such that fluid is blocked from flowing through it.

To accomplish the foregoing, a controller may be used to control the first and second motors. In particular, the controller is typically configured to generate the appropriate control signals for each of the motors. The controller may be a standalone controller for the actuator or a controller operating in coordination with a higher level control device. A similar controller or control scheme may be used in the various embodiments to provide control of motors in any of the embodiments discussed above.

EXAMPLES

To experimentally validate the properties of an inventive five-chamber cylinder actuator, a prototype of Variant 1 of Table 1 above was designed, fabricated, and experimentally tested. To compare the cylinder characteristics to a prior art sized cylinder, the dimensions of the prototype were selected to match the maximum actuation force of a 1.9 cm (0.75 in) inside-diameter hydraulic cylinder with an approximate stroke length of 4.4 cm (1.75 in). As such, the inventive prototype was designed with an inner-cylinder bore of 1.9 cm and an outer-cylinder bore of 3.2 cm, which resulted in a total outer diameter of the inventive five-chamber cylinder actuator of 3.4 cm. The inventive five-chamber cylinder actuator prototype was fabricated from 7075 aluminum. The inventive five-chamber cylinder actuator prototype is shown assembled in the retracted and extended positions, respectively, in FIGS. 5A, 5B.

Figure 12A:
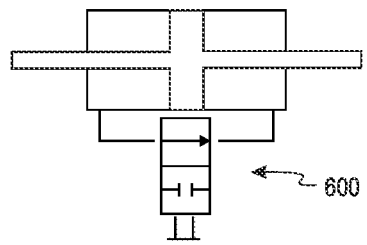
FIG. 12A is a schematic drawing of a comparative cylinder actuator configuration using a double-rod cylinder discussed in the Examples.
Figure 12B:
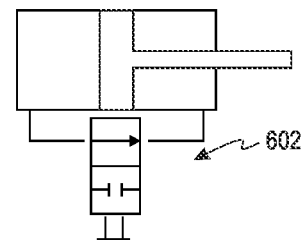
FIG. 12B is a schematic drawing of a comparative cylinder actuator configuration using a single-rod cylinder discussed in the Examples.
Figure 12C:
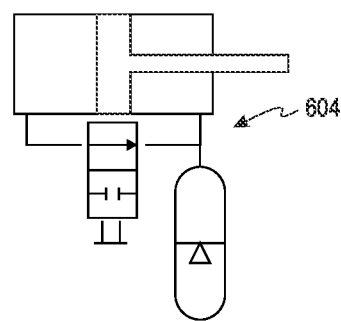
FIG. 12C is a schematic drawing of a comparative cylinder actuator configuration using a single-rod cylinder with accumulator attached to a rod end discussed in the Examples.
Figure 12D:
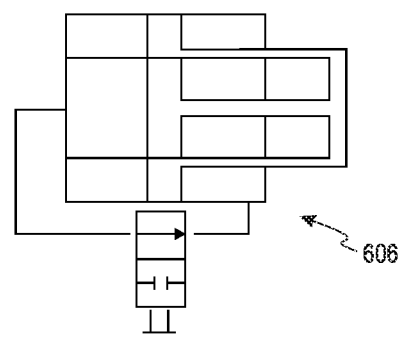
FIG. 12D is a schematic drawing of an inventive five-chamber cylinder actuator configuration discussed in the Examples.

The behavior of the inventive five-chamber cylinder actuator prototype was characterized and compared to three other hydraulic actuator configurations (i.e., a total of four configurations) under two experimental conditions. The three comparative configurations tested are shown in FIGS. 12A-C, while the inventive configuration is shown in FIG. 12D. FIG. 12A is a comparative double-rod cylinder actuator 600; FIG. 12B is a comparative single-rod cylinder actuator 602; and FIG. 12C is a comparative single-rod cylinder actuator 604 with accumulator on rod-side of piston. FIG. 12D is an inventive five-chamber cylinder actuator prototype 606.

Figure 13:
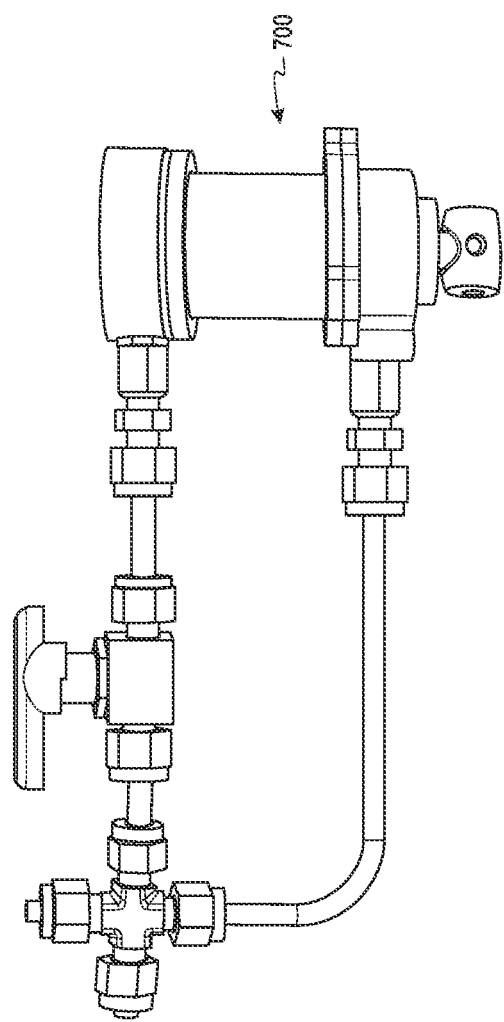
FIG. 13 is a side view of the inventive five-chamber cylinder actuator of FIG. 12D in closed test circuit a ball valve in between cylinder ports used in the Examples.

All cylinders had an effective cylinder bore of 1.9 cm (0.75 in) diameter and approximately 4.4 cm (1.75 in) stroke. For each cylinder configuration in the experiment, the two cylinder fluid ports were connected using rigid steel tubing with a ball valve positioned in between the two ports as shown in the schematics of FIG. 13. This has been designated generally as reference 700. The capped connected shown was used for filling, but sealed off during the experimental characterization. The cylinder force-displacement relationship was measured under two test conditions: (1) the cylinder ports connected with the ball valve open, and (2) the cylinder ports connected with the ball valve closed. For a constant-volume cylinder, the first condition (ball valve open) should allow free movement of the cylinder rod throughout the cylinder stroke, and the ideal force-displacement relationship would be zero force through the range of motion. The second condition (ball valve closed) corresponds to what is commonly called a "hydraulic lock," where the desired behavior is to be locked against motion in both directions. Thus, the two experimental conditions are essentially complements: the first condition should produce approximately zero force, while the second condition should provide approximately zero motion.

To measure the force-displacement relationship for each of the cylinder actuators depicted in FIGS. 12A-D, forces were applied bidirectionally to the actuator rod. For the valve-open (VO) test condition, a lever press was used to incrementally move the rod through its range of motion in approximately 4 mm increments, stopping to measure displacement and force at each increment. This process was repeated throughout the range of motion, or until the load cell measured 500 N, whichever came first. This process was repeated for three cycles of measurement (i.e., three actuator strokes). For the valve-closed (VC) test condition, the piston was started in the center of the stroke when the ball valve was closed, and rod forces were applied bidirectionally in approximately 50 N increments, up to 500 N. This process was repeated for three cycles.

The experimental results for each tested comparative cylinder actuators 600, 602, 604 of FIGS. 12A-C and inventive cylinder actuator 606 of FIG. 12D for both the VO and VC test conditions are shown in FIGS. 14A-H. FIGS. 14A-H plotted force on the vertical axis and plotted position on the horizontal axis. Positive force values indicate tensile rod force and negative forces indicate compressive force. The middle of the stroke for each cylinder corresponds to a position of zero, such that positive displacement values represent extension and negative displacement values represent retraction.

Figure 14A:
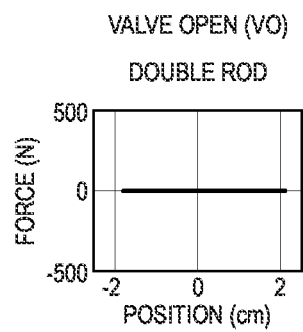
FIG. 14A is the experimental force-displacement result for FIG. 12A under a valve-open (VO) test condition.
Figure 14B:
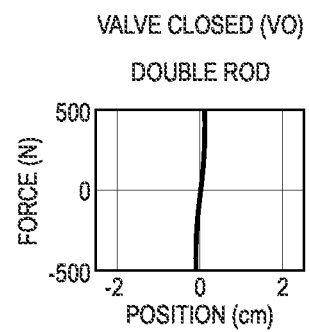
FIG. 14B is the experimental force-displacement result for FIG. 12A under a valve-closed (VC) test condition.

Referring to FIGS. 14A, 14B, the comparative double-rod cylinder actuator was characterized by near ideal constant-volume behavior (i.e., near zero-force in the VO condition, and near zero-displacement in the VC). The double-rod cylinder actuator results in FIGS. 14A, B differed only slightly from the ideal due to seal friction in the VO condition, and due to fluidic, structural, and seal compliance in the VC condition.

Figure 14C:
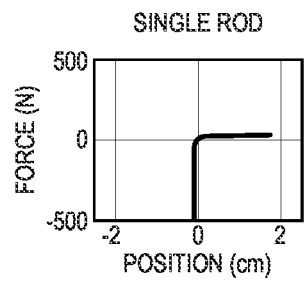
FIG. 14C is the experimental force-displacement result for FIG. 12B under a valve-open (VO) test condition.
Figure 14D:
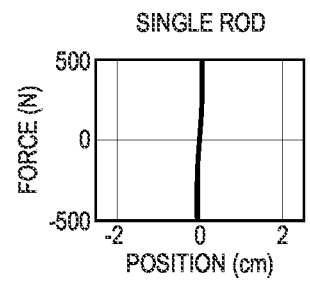
FIG. 14D is the experimental force-displacement result for FIG. 12B under a valve-closed (VC) test condition.

Referring to FIGS. 14C, 14D, the results of the same tests were performed on the comparative single-rod cylinder actuator 602 of FIG. 12B. Here, the VC case in FIG. 14D showed that the comparative single-rod cylinder actuator provided a near ideal hydraulic lock behavior. The comparative single-rod cylinder actuator 604 in FIG. 14C, however, failed to provide appropriate zero-force behavior in the VO case due to the non-constant-volume (i.e., non-symmetric) nature of the single-rod cylinder actuator 604. Rather, in the rod retraction direction the cylinder was essentially locked since the rod volume could not be introduced into the closed volume of the fluid circuit. The rod was able to move in the rod extension direction, although doing so created a vacuum in the fluid that acted to pull the rod towards the zero position. Thus, the comparative single-rod cylinder actuator was unable to provide appropriate constant-volume behavior.

Figure 14E:
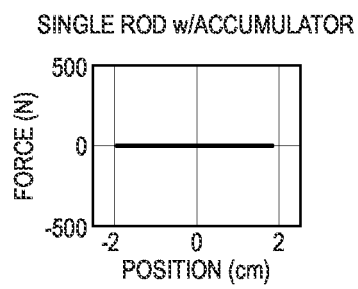
FIG. 14E is the experimental force-displacement result for FIG. 12C under a valve-open (VO) test condition.
Figure 14F:
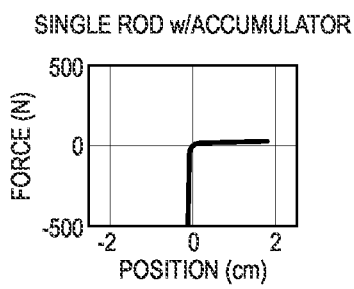
FIG. 14F is the experimental force-displacement result for FIG. 12C under a valve-closed (VC) test condition.

The problem of variable fluid volume can be accommodated via use of an accumulator on the rod-side of the cylinder such as shown with comparative cylinder actuator 604 of FIGS. 14E, 14F. Here, under the VO condition, the rod was able to move throughout the stroke with near ideal (i.e., zero-force) behavior since the accumulator accommodated the change of fluid volume introduced by the piston rod. As shown in FIG. 14F, however, the system was unable to provide a bidirectional hydraulic lock in the VC case. Rather, the system was able to provide a hydraulic lock against retraction, but can at most sustain a vacuum against rod extension.

Figure 14G:
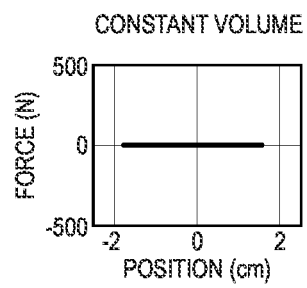
FIG. 14G is the experimental force-displacement result for FIG. 12D under a valve-open (VO) test condition.
Figure 14H:
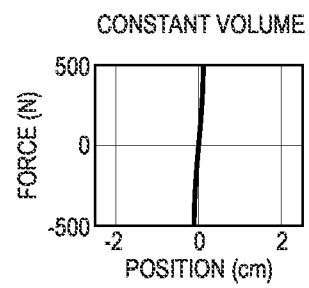
FIG. 14H is the experimental force-displacement result for FIG. 12D under a valve-closed (VC) test condition.

Referring to FIGS. 14G, 14H, the results of the inventive cylinder actuator 606 of FIG. 12D are shown. As shown in FIGS. 14G, 14H, the inventive cylinder actuator 606, like the results of the comparative double-rod cylinder actuator 600 in FIGS. 14A, 14B provided essentially ideal constant-volume behavior under both test conditions.

Figures 15A, 15B:
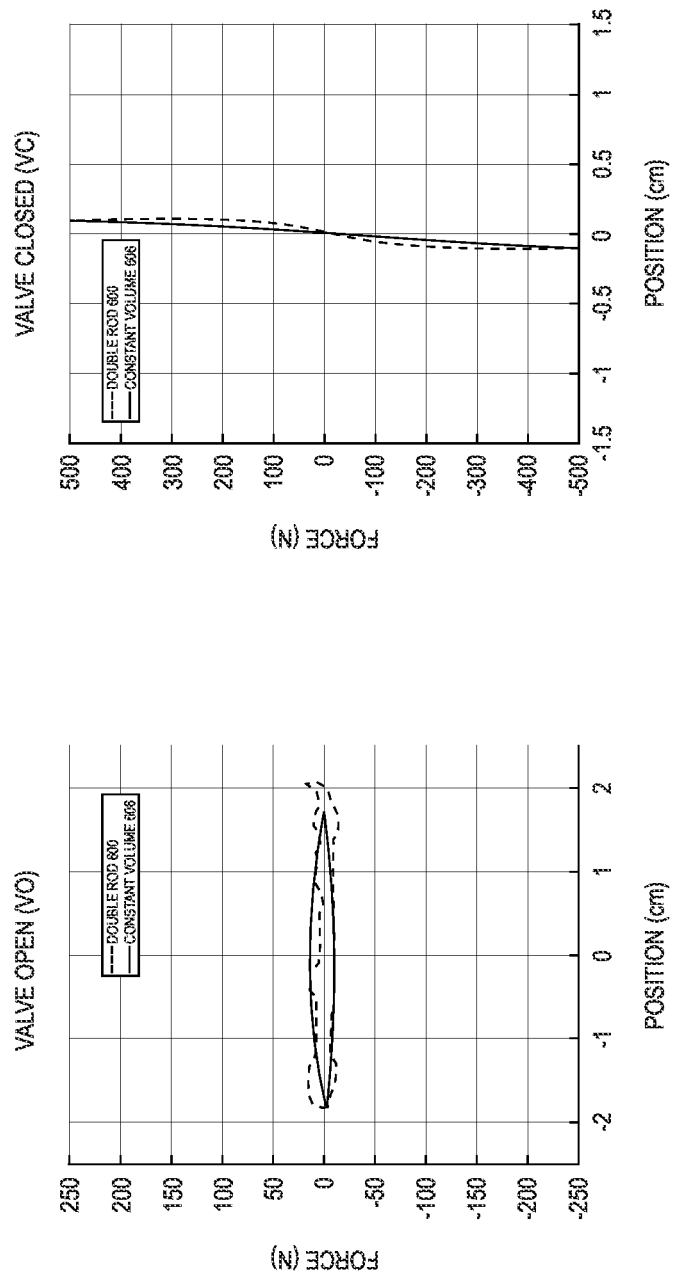
FIG. 15A is a graph plotting force and position with respect to the double-rod cylinder actuator of FIG. 12A and the inventive five-chamber cylinder actuator of FIG. 12D under valve-open (VO) test conditions.
FIG. 15B is a graph plotting force and position with respect to the double-rod cylinder actuator of FIG. 12A and the inventive five-chamber cylinder actuator of FIG. 12D under valve-closed (VC) test conditions.

A more direct comparison of the data comparing only the comparative double-rod cylinder actuator 600 and the inventive cylinder actuator 606 is shown in FIG. 15. As shown in FIG. 15, both provided essentially identical behavior, different from the ideal only in seal friction for the VO condition, and system compliance for the VC condition. Therefore, the primary difference between these two actuators is the geometric envelope each requires and the associated mounting conditions.

While various embodiments of the present invention have been described above, it should be understood that they have been presented by way of example only, and not limitation. Numerous changes to the disclosed embodiments can be made in accordance with the disclosure herein without departing from the spirit or scope of the invention. Thus, the breadth and scope of the present invention should not be limited by any of the above described embodiments. Rather, the scope of the invention should be defined in accordance with the following claims and their equivalents.

Although the invention has been illustrated and described with respect to one or more implementations, equivalent alterations and modifications will occur to others skilled in the art upon the reading and understanding of this specification and the annexed drawings. In addition, while a particular feature of the invention may have been disclosed with respect to only one of several implementations, such feature may be combined with one or more other features of the other implementations as may be desired and advantageous for any given or particular application.

The terminology used herein is for the purpose of describing particular embodiments only and is not intended to be limiting of the invention. As used herein, the singular forms "a", "an" and "the" are intended to include the plural forms as well, unless the context clearly indicates otherwise. Furthermore, to the extent that the terms "including", "includes", "having", "has", "with", or variants thereof are used in either the detailed description and/or the claims, such terms are intended to be inclusive in a manner similar to the term "comprising."

Unless otherwise defined, all terms (including technical and scientific terms) used herein have the same meaning as commonly understood by one of ordinary skill in the art to which this invention belongs. It will be further understood that terms, such as those defined in commonly used dictionaries, should be interpreted as having a meaning that is consistent with their meaning in the context of the relevant art and will not be interpreted in an idealized or overly formal sense unless expressly so defined herein.

What is claimed is:

1. A cylinder actuator, comprising:
    a body assembly including a first cylinder nested concentrically within a second cylinder, the first cylinder including a first end and a second end, the second cylinder including a first end and a second end; and
    a piston assembly sliding linearly within the first and second cylinders of the body assembly, the piston assembly including a first piston assembly end and a second piston assembly end, the first piston assembly end including a first piston and a second piston, the first piston being configured to move within the first cylinder, the second piston being configured to move within the second cylinder, the piston assembly further includes a first piston rod and a second piston rod, the first piston rod extending from the first piston through the first end of the first cylinder, the second piston rod extending from the second piston through the first end of the second cylinder, the first and second piston rods being joined at the second piston assembly end that is located outside of the first and second cylinders,
    wherein the intersections of the body assembly and the piston assembly form five separable variable-volume fluid chambers, the five separable variable-volume fluid chambers including a first fluid chamber defined by the annular space between a first cylinder wall and a second cylinder wall that exists between the second piston and the second end of the second cylinder; a second fluid chamber defined by the annular space between the first cylinder wall and second cylinder wall that exists between the second piston and the first end of the second cylinder; a third fluid chamber defined by the annular space within walls of the second piston rod between the first end of the first cylinder and the second piston assembly end; a fourth fluid chamber defined by the annular space within the first cylinder wall between the first piston and the first end of the first cylinder; and a fifth fluid chamber defined by the space within the first cylinder wall between the first piston and the second end of the first cylinder,
    wherein the cylinder actuator contains a first volume of working fluid and a second volume of working fluid, the first volume of working fluid being contained within a first variable-volume fluid space and the second volume of working fluid being contained within a second variable-volume fluid space, the first piston having a first side and a second side, the second piston having a first side and a second side, the first side of the first piston facing the second end of the first cylinder, the first side of the second piston facing the second end of the second cylinder, the second side of the first piston facing the first end of the first cylinder, the second side of the second piston facing the first end of the second cylinder, the first volume of working fluid being in contact with at least the first side of at least one of the first and second pistons, and the second volume of working fluid being in contact with at least the second side of at least one of the first and second pistons,
    wherein an area of contact between the first volume of working fluid and the first side of at least one of the first and second pistons is substantially equal to an area of contact between the second volume of working fluid and the second side of at least one of the first and second pistons, wherein at least one of the first, second, third, fourth and fifth fluid chambers does not contain the first volume of working fluid or the second volume of working fluid,
    wherein the body assembly further includes at least a first cylinder port and a second cylinder port, the first cylinder port and the second cylinder port being configured to be in fluid communication through a fluidic restriction.

2. The cylinder actuator of claim 1, wherein the fluidic restriction between the first and second cylinder ports is a hydraulic valve that is configured to vary the resistance to fluid flow based on a mechanical or electromechanical adjustment, and wherein the fluid volume contained within the hydraulic valve is invariant as a function of the valve fluidic resistance adjustment.

3. The cylinder actuator of claim 1, wherein the cylinder actuator further includes a power screw assembly, the power screw assembly including a power screw and a power screw nut, the power screw nut being mounted within the piston assembly and the power screw is rotationally affixed to the first cylinder such that rotation of the power screw drives the piston assembly linearly within the first cylinder, the power screw being driven by a motor that is affixed to the body assembly.

4. The cylinder actuator of claim 3, further comprising a first motor that drives the power screw and a second motor that adjusts the fluidic resistance of the valve, and wherein the cylinder actuator is controlled in one of at least a first control state and a second control state.

5. The cylinder actuator of claim 4, wherein the first control state controls the actuator force during power generation, and the second control state controls the actuator force during power dissipation.

6. The cylinder actuator of claim 5, wherein the first motor exerts the desired actuator control force between the body assembly and piston assembly in the first control state, and wherein the second motor configures the adjustable fluidic restriction in a minimum restriction state.

7. The cylinder actuator of claim 6, wherein the first motor is de-energized in the second control state, the second motor being used to control the adjustable fluidic restriction to provide the desired actuator control force between the body assembly and piston assembly.

8. The cylinder actuator of claim 6, where the actuator further includes a third control state in which the first motor is de-energized and the second motor configures the adjustable fluidic restriction in a maximum restriction state.

9. The cylinder actuator of claim 1, wherein the area of contact between the first volume of working fluid and the first side of the second piston is substantially equal to the area of contact between the second volume of working fluid and the second side of the first piston.

10. A cylinder actuator, comprising:
a body assembly including a first cylinder nested concentrically within a second cylinder, the first cylinder including a first end and a second end, the second cylinder including a first end and a second end; and
a piston assembly sliding linearly within the first and second cylinders of the body assembly, the piston assembly including a first piston assembly end and a second piston assembly end, the first piston assembly end including a first piston and a second piston, the first piston being configured to move within the first cylinder, the second piston being configured to move within the second cylinder, the piston assembly further includes a first piston rod and a second piston rod, the first piston rod extending from the first piston through the first end of the first cylinder, the second piston rod extending from the second piston through the first end of the second cylinder, the first and second piston rods being joined at the second piston assembly end that is located outside of the first and second cylinders,
wherein the intersections of the body assembly and the piston assembly form five separable variable-volume fluid chambers, the five separable variable-volume fluid chambers including a first fluid chamber defined by the annular space between a first cylinder wall and a second cylinder wall that exists between the second piston and the second end of the second cylinder; a second fluid chamber defined by the annular space between the first cylinder wall and second cylinder wall that exists between the second piston and the first end of the second cylinder; a third fluid chamber defined by the annular space within walls of the second piston rod between the first end of the first cylinder and the second piston assembly end; a fourth fluid chamber defined by the annular space within the first cylinder wall between the first piston and the first end of the first cylinder; and a fifth fluid chamber defined by the space within the first cylinder wall between the first piston and the second end of the first cylinder,
wherein the cylinder actuator contains a first volume of working fluid and a second volume of working fluid, the first volume of working fluid being contained within a first variable-volume fluid space and the second volume of working fluid being contained within a second variable-volume fluid space, the first piston having a first side and a second side, the second piston having a first side and a second side, the first side of the first piston facing the second end of the first cylinder, the first side of the second piston facing the second end of the second cylinder, the second side of the first piston facing the first end of the first cylinder, the second side of the second piston facing the first end of the second cylinder, the first volume of working fluid being in contact with at least the first side of at least one of the first and second pistons, and the second volume of working fluid being in contact with at least the second side of at least one of the first and second pistons,
wherein an area of contact between the first volume of working fluid and the first side of at least one of the first and second pistons less an area of contact between the first volume of working fluid and the second side of at least one of the first and second pistons is substantially equal to an area of contact between the second volume of working fluid and the second side of at least one of the first and second pistons,
wherein at least one of the first, second, fourth and fifth fluid chambers does not contain the first volume of working fluid or the second volume of working fluid.

11. The cylinder actuator of claim 10, wherein the area of contact between the first volume of working fluid and the first side of the second piston less the area of contact between the first volume of working fluid and the second side of the second piston is substantially equal to the area of contact between the second volume of working fluid and the second side of the first piston.

12. The cylinder actuator of claim 10, wherein the area of contact between the first volume of working fluid and the first side of the second piston less the area of contact between the first volume of working fluid and the second side of the first piston is substantially equal to the area of contact between the second volume of working fluid and the second side of the second piston.

13. The cylinder actuator of claim 10, wherein the area of contact between the first volume of working fluid and the first side of the first piston less the area of contact between the first volume of working fluid and the second side of the second piston is substantially equal to the area of contact between the second volume of working fluid and the second side of the first piston.

14. The cylinder actuator of claim 10, wherein the area of contact between the first volume of working fluid and the first side of the first piston less the area of contact between the first volume of working fluid and the second side of the first piston is substantially equal to the area of contact between the second volume of working fluid and the second side of the second piston.

15. The cylinder actuator of claim 10, wherein the first cylinder has a generally circular cross-section or a circular cross-section.

16. The cylinder actuator of claim 10, wherein the first cylinder has a generally oval cross-section or an oval cross-section.

17. The cylinder actuator of claim 10, wherein the body assembly further includes at least a first cylinder port and a second cylinder port, the first cylinder port and the second cylinder port being configured to be in fluid communication through a fluidic restriction.

18. The cylinder actuator of claim 17, wherein the fluidic restriction between the first and second cylinder ports is a hydraulic valve that is configured to vary the resistance to fluid flow based on a mechanical or electromechanical adjustment, and wherein the fluid volume contained within the hydraulic valve is invariant as a function of the valve fluidic resistance adjustment.

19. The cylinder actuator of claim 10, wherein the cylinder actuator further includes a power screw assembly, the power screw assembly including a power screw and a power screw nut, the power screw nut being mounted within the piston assembly and the power screw is rotationally affixed to the first cylinder such that rotation of the power screw drives the piston assembly linearly within the first cylinder, the power screw being driven by a motor that is affixed to the body assembly.

20. The cylinder actuator of claim 17, wherein the fluidic restriction between the first and second cylinder ports is a hydraulic valve that is configured to vary the resistance to fluid flow based on a mechanical or electromechanical adjustment, and wherein the fluid volume contained within the hydraulic valve is invariant as a function of the valve fluidic resistance adjustment.

21. The cylinder actuator of claim 10, wherein the at least one of the first, second, third, fourth and fifth fluid chambers is vented to the atmosphere.

* * * * *